United States Patent
Zhu

(10) Patent No.: US 11,308,253 B2
(45) Date of Patent: Apr. 19, 2022

(54) PARTITIONING IN POST-LAYOUT CIRCUIT SIMULATION

(71) Applicant: Synopsys, Inc., Mountain View, CA (US)

(72) Inventor: Ningjia Zhu, San Ramon, CA (US)

(73) Assignee: Synopsys, Inc., Mountain View, CA (US)

(*) Notice: Subject to any disclaimer, the term of this patent is extended or adjusted under 35 U.S.C. 154(b) by 0 days.

(21) Appl. No.: 16/046,957

(22) Filed: Jul. 26, 2018

(65) Prior Publication Data
US 2019/0034574 A1    Jan. 31, 2019

Related U.S. Application Data

(60) Provisional application No. 62/537,751, filed on Jul. 27, 2017.

(51) Int. Cl.
*G06F 30/392* (2020.01)
*G06F 30/327* (2020.01)
*G06F 111/04* (2020.01)
*G06F 111/20* (2020.01)
*G06F 119/06* (2020.01)

(52) U.S. Cl.
CPC .......... *G06F 30/392* (2020.01); *G06F 30/327* (2020.01); *G06F 2111/04* (2020.01); *G06F 2111/20* (2020.01); *G06F 2119/06* (2020.01)

(58) Field of Classification Search
CPC .... G06F 30/392; G06F 30/394; G06F 30/398; G06F 30/327; G06F 30/33; G06F 30/347; G06F 2111/04; G06F 2111/20; G06F 2119/06
USPC .......................................................... 716/103
See application file for complete search history.

(56) References Cited

U.S. PATENT DOCUMENTS

| | | |
|---|---|---|
| 5,553,008 A | 9/1996 | Huang |
| 6,577,992 B1 | 6/2003 | Tcherniaev |
| 6,807,520 B1 | 10/2004 | Zhou |
| 7,024,652 B1 | 4/2006 | McGaughy et al. |
| 7,324,363 B2 | 1/2008 | Kerns |
| 8,060,355 B2 | 11/2011 | Kerns |

(Continued)

OTHER PUBLICATIONS

Umit V. Catalyurek, "PaToH: Partitioning Tool for Hypergraphs", Revised Mar. 2011, Oregon State University, US.
(Continued)

*Primary Examiner* — Paul Dinh
(74) *Attorney, Agent, or Firm* — Fenwick & West LLP

(57) ABSTRACT

The independent claims of this patent signify a concise description of embodiments. New techniques for the partitioning of big element blocks in a circuit are disclosed. The techniques partition both pre-layout and post-layout circuits. If a post-layout circuit has different simulation results from a pre-layout circuit, the techniques determine where and how "cross-talk" of the RC networks due to RC extraction is changing the circuit physics behavior from the original design of the circuit. A flow of the local circuit simulation of the pre-layout netlist and the post-layout netlist of the same design is presented. A flow of reference or relative or differential circuit simulation of a known design and a new design of the same kind is described. This Abstract is not intended to limit the scope of the claims.

20 Claims, 21 Drawing Sheets

(56) References Cited

U.S. PATENT DOCUMENTS

| | | | |
|---|---|---|---|
| 8,463,587 B2 | 6/2013 | Zhu | |
| 2015/0331981 A1* | 11/2015 | Mulvaney | G06F 30/394 |
| | | | 716/134 |
| 2015/0379183 A1* | 12/2015 | Odabasi | G06F 30/392 |
| | | | 716/103 |

OTHER PUBLICATIONS

Thomas H. Cormen, "Introduction to Algorithms", Jul. 2009, The MIT Press, US.

Roxana Ionutiu, "Model reduction for multi-terminal RC circuits", Apr. 2010, Jacobs University, Bremen, Germany.

* cited by examiner

PARTITIONING IN POST-LAYOUT CIRCUIT SIMULATION

CROSS REFERENCE TO RELATED APPLICATIONS

This patent application claims priority benefit under 35 U.S.C. Section 119(e) to provisional U.S. Patent Application Ser. No. 62/537,751, filed 27 Jul. 2017. The contents of this provisional patent application are incorporated herein by reference in their entirety and for all purposes.

BACKGROUND

With the advance of semiconductor technology, especially for less than 10 nanometers (nm) technology nodes, a circuit simulation tool, for example, a simulation tool available in an electronic design automation (EDA) system, is indispensable for integrated circuit (IC) design. The circuit designers use it to verify power supplies, timing, delay, static and dynamical leakage currents, etc. At least two types of circuit simulation tools are available as products for covering circuit verifications for small-, medium-, and large-scale IC designs.

The first tool family is based on the Simulation Program with Integrated Circuit Emphasis (SPICE) electronic circuit simulator, an industry standard since the 1980s, which is the foundation for products such as HSPICE® available from Synopsys®. With simulators such as SPICE, circuits are represented as a graph, where the edges of the graph represent models of circuit elements (such as resistors, capacitors, diodes, transistors, etc.) and the nodes of the graph represent where the models of the circuit elements connect together. Often these circuit graphs are referred to as "netlists", and each time a circuit element is used in a netlist, it is referred to as an "instance". Simulators such as SPICE perform their calculations by applying Kirchoff's laws to such node/edge graphs. For example, Kirchoff's current law (KCL) states that the algebraic sum of all of the currents flowing out of and into any circuit node is zero. Kirchoff's voltage law (KVL) states that the directed sum of the voltages around any closed circuit in the graph must also be zero. SPICE programs build a linear model of the circuit with equations based on KVL and KCL, and current-voltage (I-V) models of the circuit elements.

SPICE2, which was released in 1975 in Fortran (SPICE3 was released in 1989 in the C programming language) can perform the following: AC analysis (linear small-signal frequency domain analysis), DC analysis (nonlinear quiescent point calculation), DC transfer curve analysis, noise analysis, transfer function analysis (input/output gains and impedance calculations), transient analysis (for solving time dependent circuit analysis), sensitivity analysis, small signal distortion analysis and pole-zero analysis. Many commercial circuit simulators use SPICE/2/3 as a foundation for adding further simulation capabilities.

Fundamentally, Spice-based simulation tools do not perform optimizations and/or approximations for circuit connectivity, SPICE device models, and RC (resistor-capacitor) networks. The tools just convert the Kirchhoff law equations into a single matrix without circuit partitioning, and then solve the large matrix equation to obtain very accurate results for circuit parameters such as power use, timing, and leakage current, etc. One drawback of the SPICE tools is that they cannot easily process the large sparse matrices that represent large circuit designs due to the large amounts of memory needed to store the matrices, resulting in a performance that is relatively slow in an IC design cycle.

The second tool family is based on fast-SPICE, available in Synopsys products such as Nano-SIM®, HSIM®, CustomSIM®, and FineSIM®. Similar to SPICE tools, fast-SPICE tools simulate circuits, however, they partition the circuit to be simulated into weakly coupled regions, allowing useful approximations for large SPICE models (for example, for circuits with over 1,000,000 logic gates) to be determined, such as resistor/capacitor (RC) network reduction, power net reduction, memory cell array optimization for memory circuits, model simplification such as using look-up tables instead of equation models, and merging instance optimization. Due to RC extraction, the size of a post-layout circuit netlist is much larger than pre-layout one for the same design, and thus the matrix representation of the post-layout circuit is much larger. RC extraction is a process to obtain capacitance and resistance for specific descriptions of conductors in the circuit design, since conductor effects are typically included in SPICE simulations.

RC network reduction is used in these simulation tools to reduce the size of RC networks, to create an equivalent circuit network with fewer resistors and capacitors, to speed up the performance of post-layout circuit simulation to meet certain accuracy requirements, referred to as "golden" results. With RC reduction, these tools can handle very large circuits and their performances are 10× to 1000× faster than conventional SPICE tools under certain required accuracy. An explanation of one RC reduction method is available in a 2010 paper, "Model reduction for multi-terminal RC circuits" by Ionutiu.

One example of large circuit design is memory circuit design, such as DRAM, SRAM, or FLASH memories. An important technique in fast-SPICE tools is circuit network partitioning. Another technique to speed up circuit simulation performance is multi-core or parallel simulation for both SPICE and fast-SPICE, which we do not discuss herein.

Every fast-SPICE tool available from Synopsys listed above (and fast SPICE tools from other vendors) generally performs circuit partitioning as a first step. A channel connected partition, called the conventional static partition, is performed at the beginning, comprising the following two steps:

1. Determine which elements should be put in a power rail block (e.g., the rail block 102 with VDD and VSS in FIG. 1). Typically, they are a set of circuit drivers, such as ideal voltage sources.
2. Partition the remainder of the circuit, except for the rail block, based on channel connected rules to cut the circuit into several blocks with small circuits or into a large number of blocks for large circuits.

FIG. 2 is an example of a circuit partition 200 with bigger blocks, with more circuit elements, in comparison to the conventional static partitioning shown in FIG. 1. The big-block situation becomes even worse for larger designs, with the large blocks slowing down simulations. Further partitioning is needed for these kinds of big blocks in a fast-SPICE tool to speed up the performance of circuit simulation, and/or to handle very large circuit designs.

In fast-SPICE tools, two typical techniques exist for performing further partitioning. One technique follows a flattening technique like Nano-SIM, and the other technique is a hierarchical technique as used in HSIM. These are successful techniques that have dominated the fast-SPICE business market for more than ten years. The new generation of the fast-SPICE tools include CustomSIM and FineSIM available from Synopsys. CustomSIM uses a mathematical technique called PaToH for further partitioning, which is one of many alternatives that can replace the original partition rule, while FineSIM uses the enhanced hierarchical technique for further partitioning.

However, the problem of obtaining consistent results between pre-layout and post-layout formats of a circuit design is still unsolved due to the inadequate partitioning techniques in these fast-SPICE tools. Also, fast-SPICE tools do not use enough pre-layout information during the post-layout simulation.

SUMMARY

The claims signify a brief description of one or more of the innovations, embodiments, and/or examples found within this disclosure.

In some of the embodiments disclosed herein, new techniques are disclosed for the partitioning of big blocks in a circuit. The techniques can partition big blocks in both pre-layout and post-layout circuits, provided that the presence of a big partition block is not due to intrinsic circuit behavior in pre-layout design. The techniques also enable fast-SPICE tools to obtain consistent results.

If a post-layout circuit has different results from a pre-layout circuit during simulation, the techniques can determine where and how cross-talk (where one circuit creates an undesired effect in another circuit) of the RC networks due to RC extraction is changing the circuit physics behavior from the original design of the circuit. Because different kinds of RC reductions are implemented in existing fast-SPICE tools for large post-layout circuits, it is hard to determine whether different results are due to the circuit net-list itself, i.e., come from circuit RC extraction, or are due to the RC reductions in the fast-SPICE front end optimization, or are due to both factors.

In some of the embodiment disclosed herein, techniques are provided to determine the root-cause of a design change when a circuit moves from pre-layout to post-layout. The pre-layout is an original design, while after RC extraction, the post-layout can be very different from circuit functions from pre-layout, especially in different corners of different wafers. As it is important for designers to be aware of such differences between pre-layout and post-layout, therefore, in some of the embodiments disclosed herein, techniques are provided to depict such differences to help circuit designers to manage their simulations more efficiently.

Some of the embodiments disclosed herein merge and partition rail blocks and power nets to more efficiently partition the post-layout circuit structures so as to speed up circuit simulation performance.

In some of the embodiments disclosed herein, for the rest of post-layout circuit structures, the post-layout circuit partitions should have the same cut rules based on pre-layout circuit connectivity, which means that the number of post-layout blocks or sub-circuits are the same as the number of pre-layout blocks or sub-circuits except for rail and power net blocks. Any optimizations in fast-SPICE occur within pre-layout-type blocks or sub-circuits in post-layout circuits, for instance, after RC reduction and memory cell optimization. A verifier is available when a circuit moves from pre-layout to post-layout, to find what design changes are due to RC extraction, especially for interconnects between blocks or sub-circuits.

Some of the embodiments disclosed herein construct a shared database for both pre-layout and post-layout circuit data so that they can be used in parallel simulations. The parallel simulations can use the shared database to exchange information that can be applied to perform each simulation more efficiently.

Some of the embodiments disclosed herein use the technique of "sub-circuit simulation" in post-layout circuit simulation, where information from pre-layout circuit simulation is used in the post-layout simulation, using the shared database. The existing tools all are "global" circuit simulation for pre-layout and post-layout circuits.

Some of the embodiments disclosed herein use the technique of "reference circuit simulation", where one old design and one new design are simulated in parallel for comparison. The intermediate results of the parallel simulations can be shared and checked against one another.

This Summary does not attempt to completely signify any particular innovation, embodiment, or example as it can be used in commerce. Additionally, this Summary is not intended to signify essential elements of an innovation, embodiment or example or to limit the scope of the subject matter of this disclosure.

The innovations, embodiments, and/or examples found within this disclosure are not all-inclusive, but rather describe the basic significance of the subject matter. Accordingly, one use of this Summary is as a prelude to a Detailed Description presented later.

DRAWINGS

The following Detailed Description, Figures, appended Additional Figures and appended Claims signify the nature and advantages of the innovations, embodiments and/or examples of the claimed inventions. All of the Figures signify innovations, innovations, embodiments, and/or examples of the claimed inventions for purposes of illustration only and do not limit the scope of the claimed inventions. Such Figures are not necessarily drawn to scale, and are part of the Disclosure.

In the Figures, similar components or features may have the same, or similar, reference signs in the form of labels (such as alphanumeric symbols, e.g., reference numerals), and may signify similar or equivalent functionality. Further, various components of the same type may be distinguished by following the reference label by a dash and a second label that distinguishes among the similar components. If only the first reference label is used in the specification, the description is applicable to any one of the similar components having the same first reference label irrespective of the second reference label. A brief description of the Figures is below.

Figure 1:
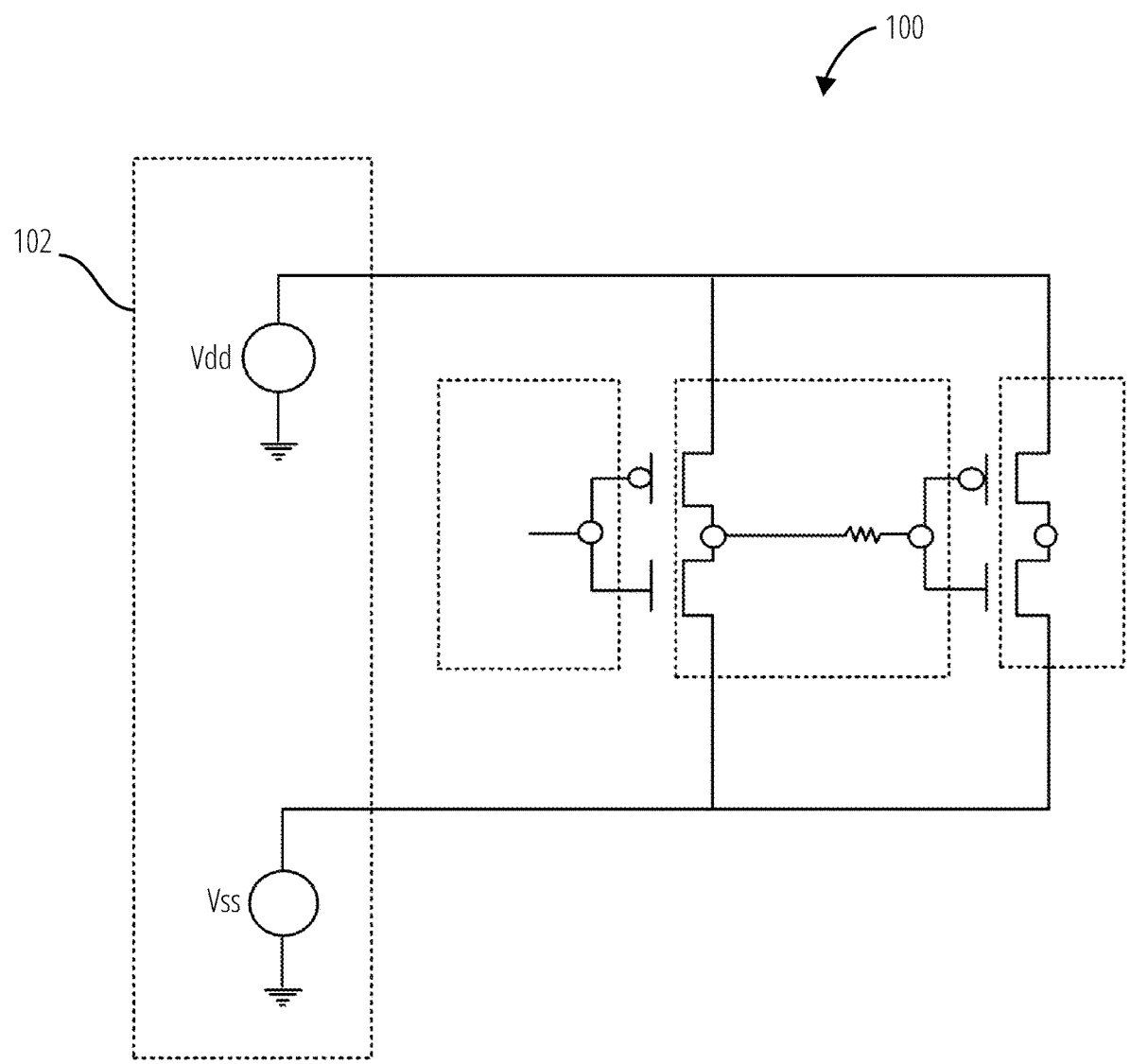
FIG. 1 illustrates a pre-layout circuit 100 in accordance with one embodiment.

In such various Figures, reference signs may be omitted as is consistent with accepted engineering practice; however, one of ordinary skill in the art will understand that the illustrated components are readily understood when viewed in context of the illustration as a whole and the accompanying disclosure describing such various figures.

DETAILED DESCRIPTION

The Figures and the following Detailed Description signify innovations, embodiments and/or examples by way of illustration only, with various features, structures or characteristics described together in a single embodiment to streamline the disclosure. Variations of any of the elements, processes, machines, systems, manufactures or compositions disclosed by such exemplary innovations, embodiments and/or examples will be readily recognized and may be used in commerce without departing from the principles of what is claimed. The Figures and Detailed Description may also signify, implicitly or explicitly, advantages and improvements of a subset of the exemplary embodiments described herein.

In the Figures and Detailed Description, numerous specific details may be described to enable one or more of the exemplary innovations, embodiments and/or examples. In the interest of not obscuring the presentation of the exemplary innovations, embodiments and/or examples in the following Detailed Description, some processing steps or operations that are known in the art may be combined together for presentation and for illustration purposes and might not be described in detail. However, a person skilled in the art will recognize that these exemplary innovations, embodiments and/or examples may be used in commerce without these specific details or with equivalents thereof. In other instances, well-known processes and devices are not described in detail as not to unnecessarily obscure aspects of these exemplary innovations, embodiments and/or examples. In other instances, some processing steps or operations that are known in the art may not be described at all. Instead, the following description is focused on the distinctive features or elements of various exemplary innovations, embodiments and/or examples. Furthermore, while this description may refer to some components of the structure in the singular tense, more than one component may be depicted throughout the Figures and like components are labeled with like numerals.

Improved partitioning techniques for transistor-level circuit simulation are herein disclosed that produce consistent results between pre-layout and post-layout circuits of a same design in a fast-SPICE tool, with similar simulation performances of both pre-layout and post-layout of the same design. Two new techniques are disclosed, local sub-circuit simulation and reference circuit simulation. Additionally, cross-talk checks are provided in terms of partition rules disclosed herein to analyze the impact of an RC network on circuit simulation when it moves from pre-layout to post-layout.

Different simulation tools have their own partition rules for the pre-layout partition. For the algorithms described herein, the partition of the post-layout circuit is based on the pre-layout circuit partition of the fast-SPICE tool.

Figure 2:
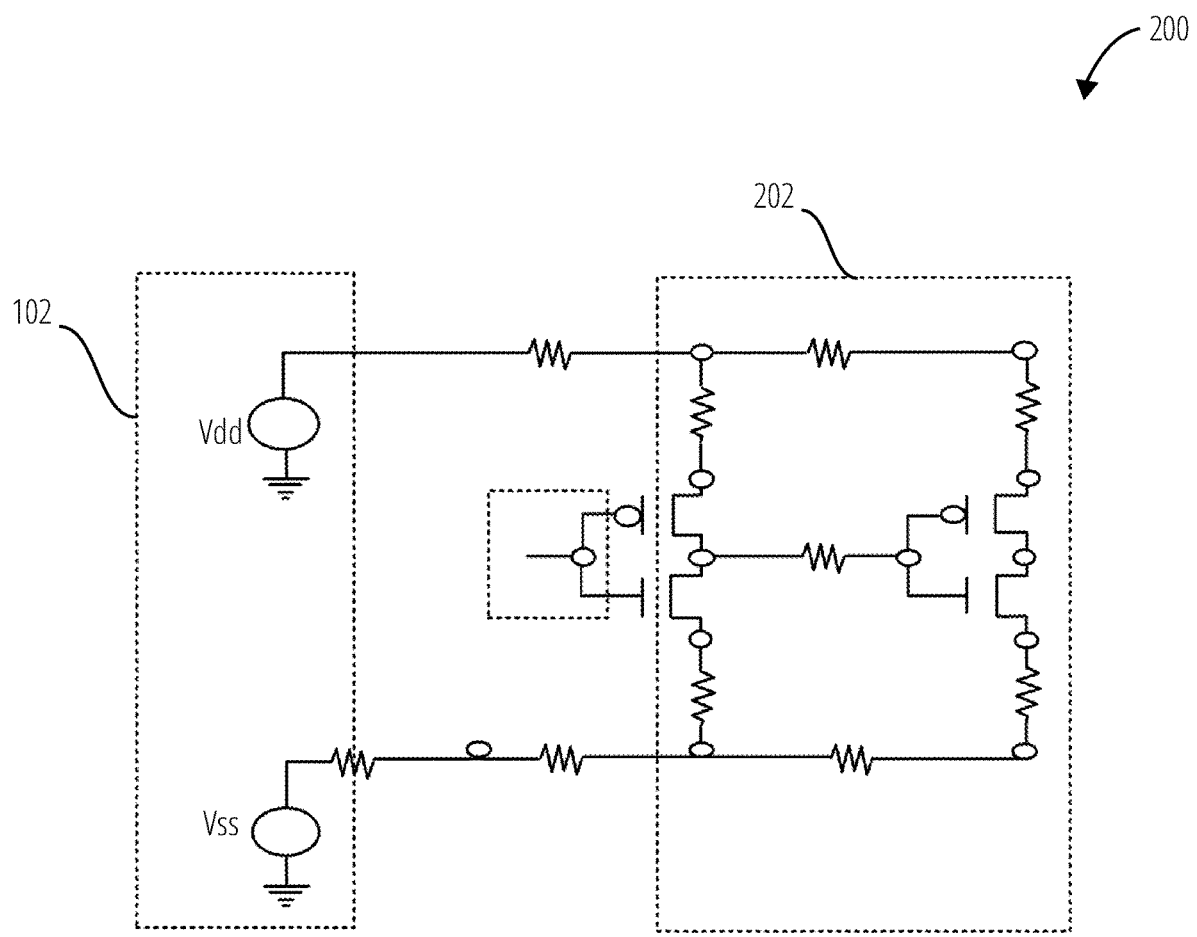
FIG. 2 illustrates a circuit partition 200 in accordance with one embodiment.

Referring again to FIG. 1, a pre-layout circuit 100 may be partitioned into several small blocks (dotted lines). In FIG. 1, four blocks are depicted, including the rail block 102 after the conventional static partition is done. For simplicity, the illustrated pre-layout circuit 100 only includes elements of ideal voltage sources, a resistor, and metal-oxide-semiconductor field-effect transistors (MOSFETs). However, a post-layout circuit, due to transistors with RC networks, would typically comprise several big blocks as shown in FIG. 2. FIG. 2 depicts the circuit of FIG. 1, with additional resistors in a pre-layout block.

FIG. 2 illustrates a circuit partition 200 with bigger blocks, including more circuit elements, in comparison to the partitioning in FIG. 1. The block size expansion problem increases for larger designs, with the large blocks slowing down simulations. Further partitioning is needed for big blocks in a fast-SPICE tool to speed up the performance of circuit simulation, and/or to handle very large circuit designs.

Figure 3:
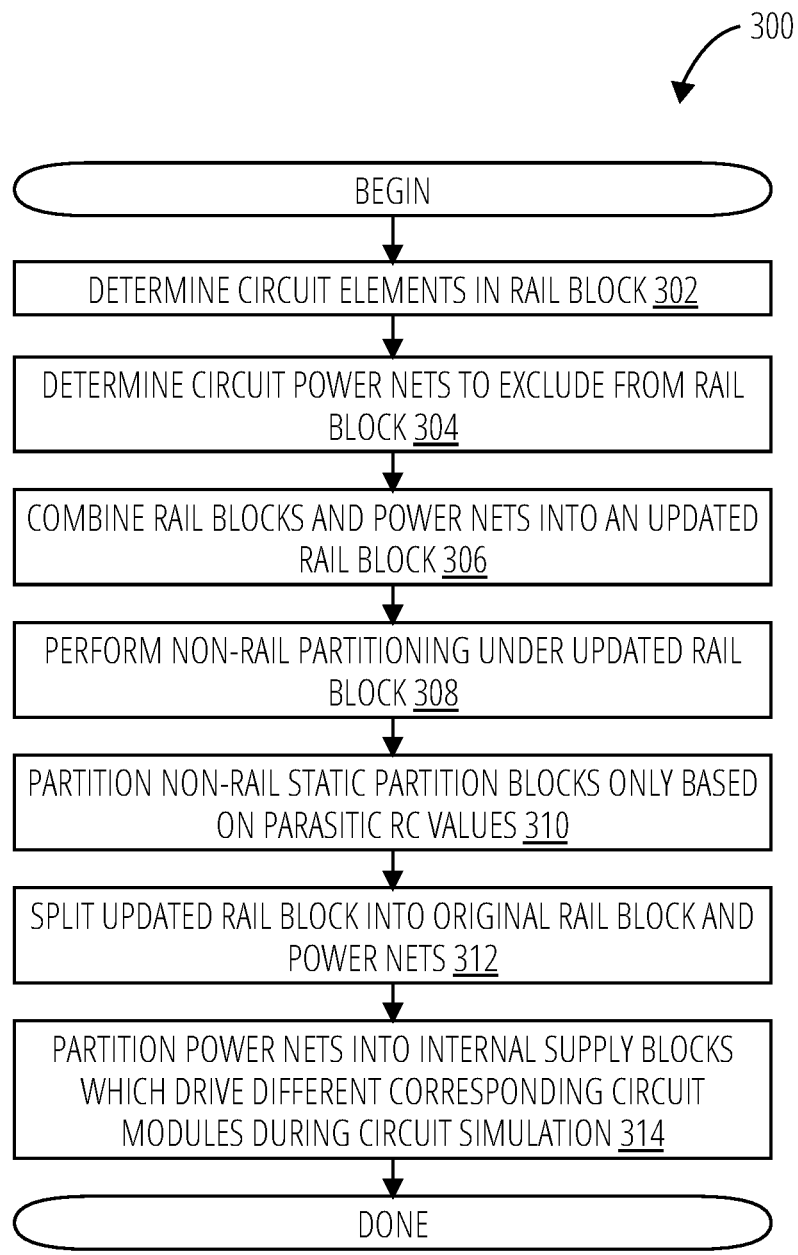
FIG. 3 illustrates a circuit partition process 300 in accordance with one embodiment.

More efficient partitioning techniques for circuit simulations may be carried out as for example illustrated in FIG. 3. A circuit partition process 300 may proceed as follows:

Step 302: Determine which circuit elements should be in a rail block. Typically, these are circuit drivers, such as ideal voltage sources (see rail block 102). This block achieves the same results as conventional static partitioning.

Step 304: Determine which circuit power nets, including internal power supplies and power switches, do not belong to the rail blocks. The fast-SPICE tools have matured techniques to exactly find where the power nets are. Designers typically know as well, and can provide this information to the circuit simulators.

Step 306: Combine the rail block from Step 302 and the power nets from Step 304 to establish a "new" (updated) rail block, similar to a symbolic rail block in the conventional static partition.

Step 308: Based on the conventional static partition rules, i.e., channel connected blocks, perform non-rail partitioning under the updated rail block.

Step 310: Further partition the non-rail static partition blocks exclusively based on parasitic RC values, which may expose RC extraction problems, by checking the conventional static partition in its corresponding pre-layout circuit.

Step 312: Split the updated rail block into the original rail blocks in the conventional static partition derived in Step 302, and the power nets derived in Step 304.

Step 314: Partition the power nets into internal supply blocks which drive different corresponding sub-circuits during circuit simulation.

Figure 4:
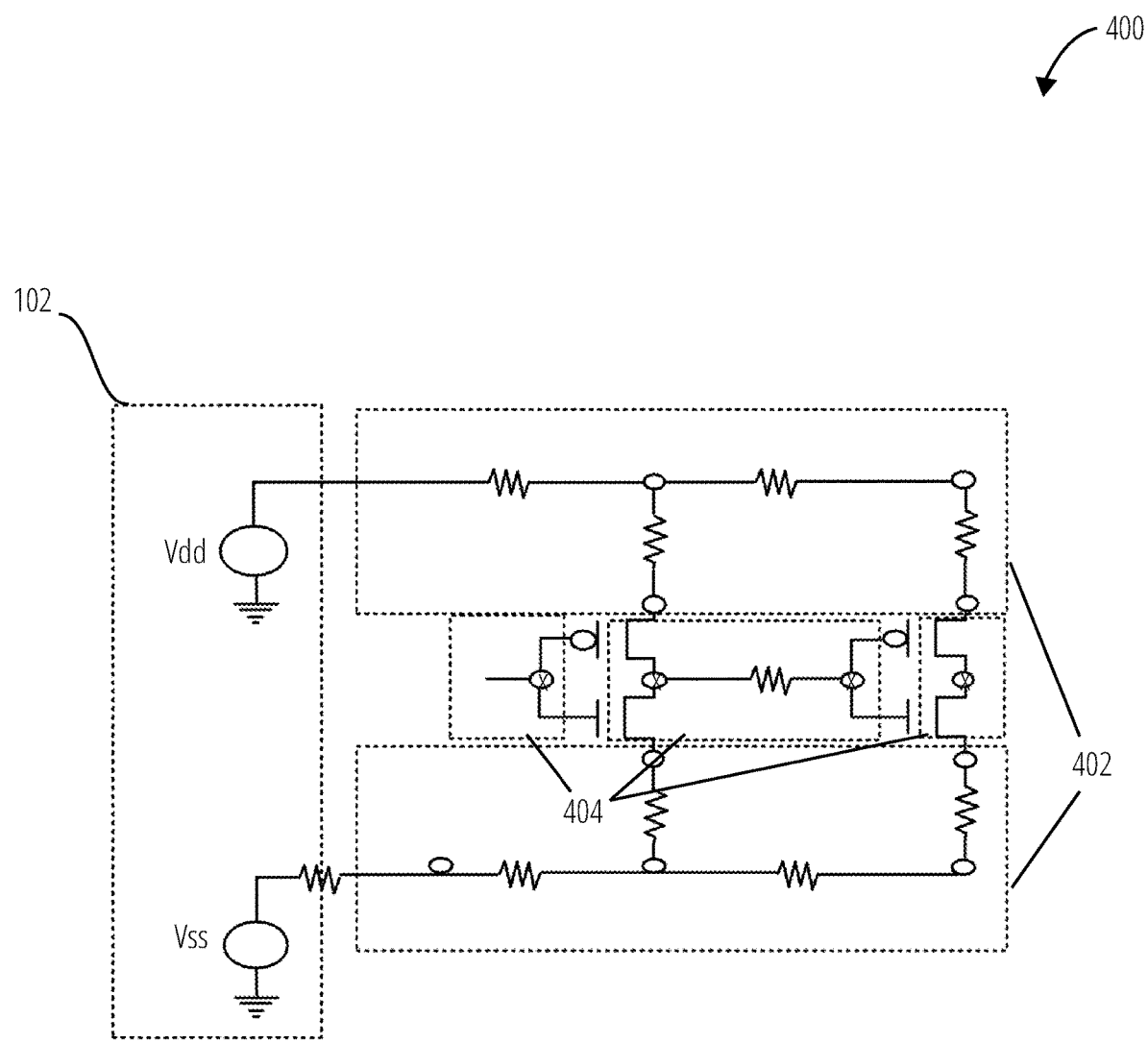
FIG. 4 illustrates a circuit partition 400 in accordance with one embodiment.

From the circuit partition process 300 of FIG. 3, the circuit with the conventional static partition depicted in FIG. 2 comprising one big block 202 becomes the partition depicted in FIG. 4, which no longer has a big block but instead has four smaller blocks. FIG. 4 depicts the circuit for FIG. 2, but applies the process of FIG. 3, which results in more and smaller partition blocks.

In FIG. 4, circuit partition 400 is shown which include ellipses marked with an "x". These x-marked ellipses represent signal nets while the open (no x-mark) ellipses represent power nets. In this partition scheme, there is one rail block 102, two power net blocks 402, and three signal blocks 404. It is straightforward for a simulator to schedule these smaller blocks, based on their driver-load relationship, to calculate block equations KCL and KVL, to obtain simulation results more efficiently. FIG. 4 illustrates the situation in which one signal block is driven by multiple power net blocks while one power net block drives multiple signal blocks. Normally a rail block either drives signal blocks directly, or drives signal blocks indirectly through power net blocks. FIG. 4 only illustrates the indirect driving scenario, in which the power net blocks are referred to as "internal power supplies".

The conventional static partition process for post-layout circuits has two disadvantages. First, with existing simulation tools, all of the blocks driven by internal power supplies are merged, through all of their conductance/capacitance paths, to produce very large blocks. These large blocks increase memory usage and slow down simulations. This problem is resolved by the partition algorithms disclosed herein, e.g., see circuit partition process 300.

Figure 11:
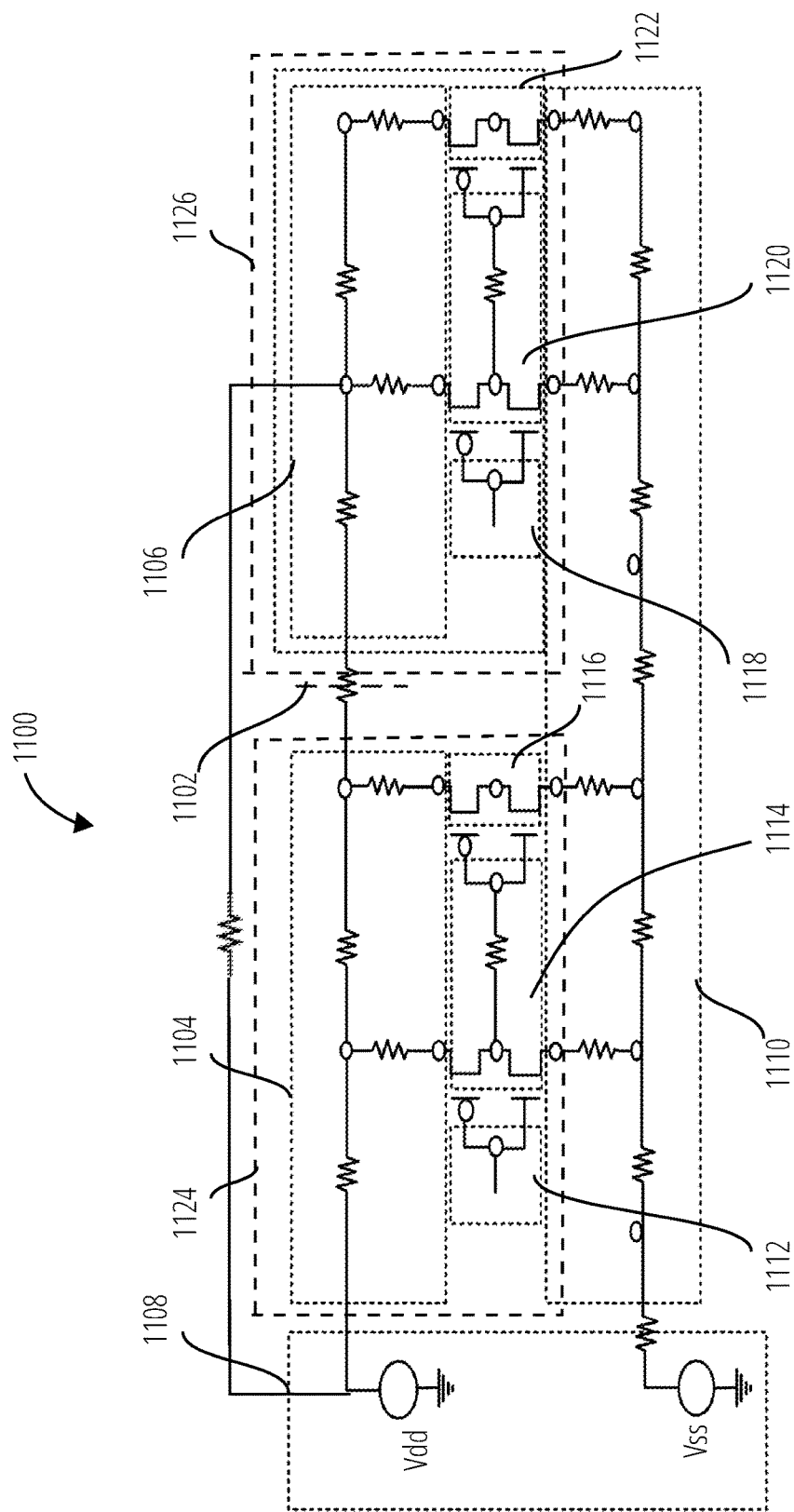
FIG. 11 illustrates a circuit partition 1100 in accordance with one embodiment.

Second, the RC extraction in the post-layout net-list, or the optimization of the front end of a fast-SPICE tool, typically generates new conductance/capacitance current paths among power net blocks, or among sub-circuits (FIG. 11 shows one partition of sub-circuits), from their pre-layout format for the same design. This effect is depicted in the pre-layout 506 section of FIG. 5 (as indicated by the added resistors). This again results in the generating of large blocks. Further, it creates cross-talk among power net blocks or among sub-circuits, due to RC extraction or RC optimization, respectively. This problem may be resolved by the partition algorithm disclosed herein, e.g., see cross-talk reduction process 600.

Figure 5:
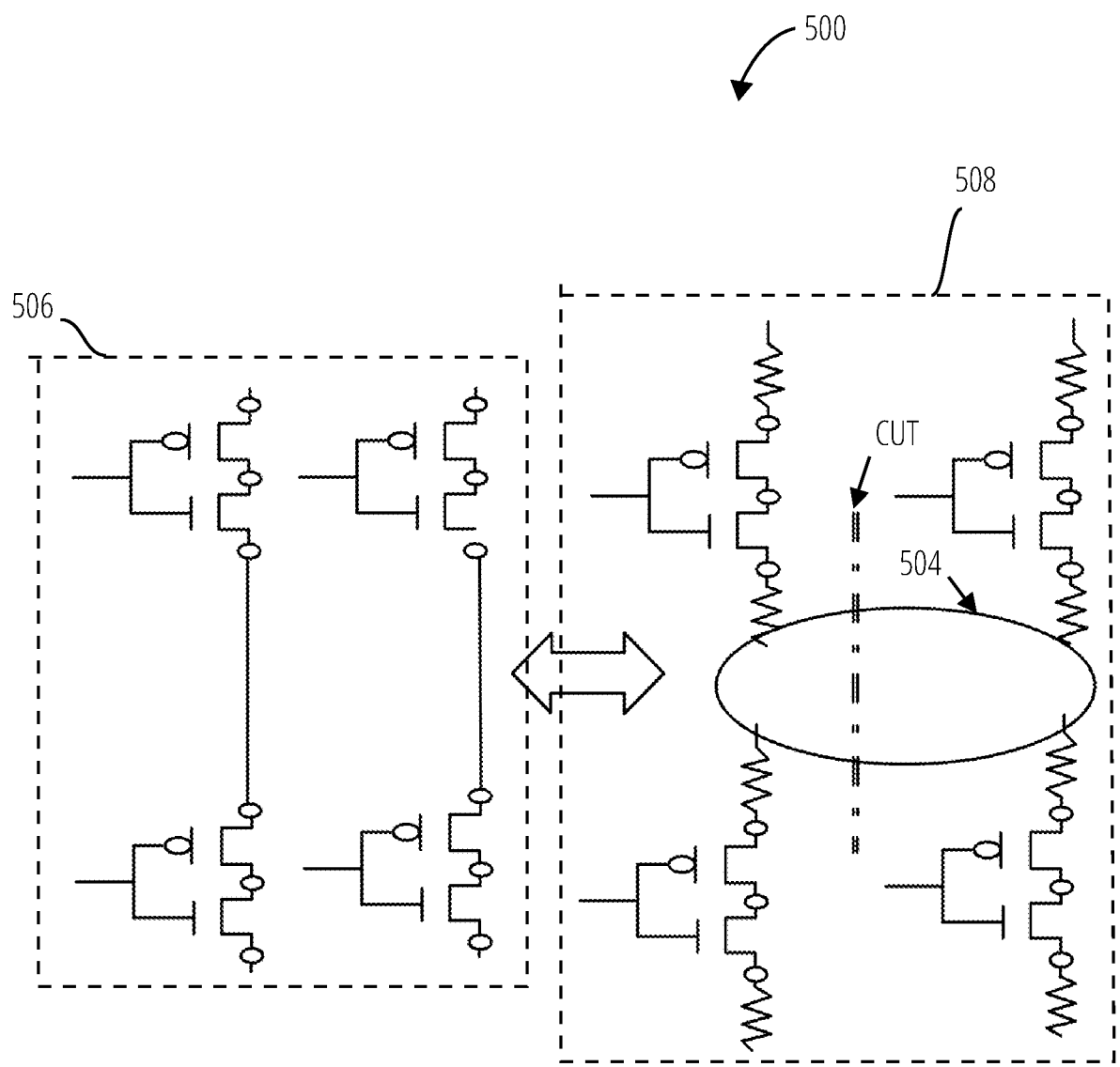
FIG. 5 illustrates pre- and post-layouts 500 in accordance with one embodiment.
Figure 6:
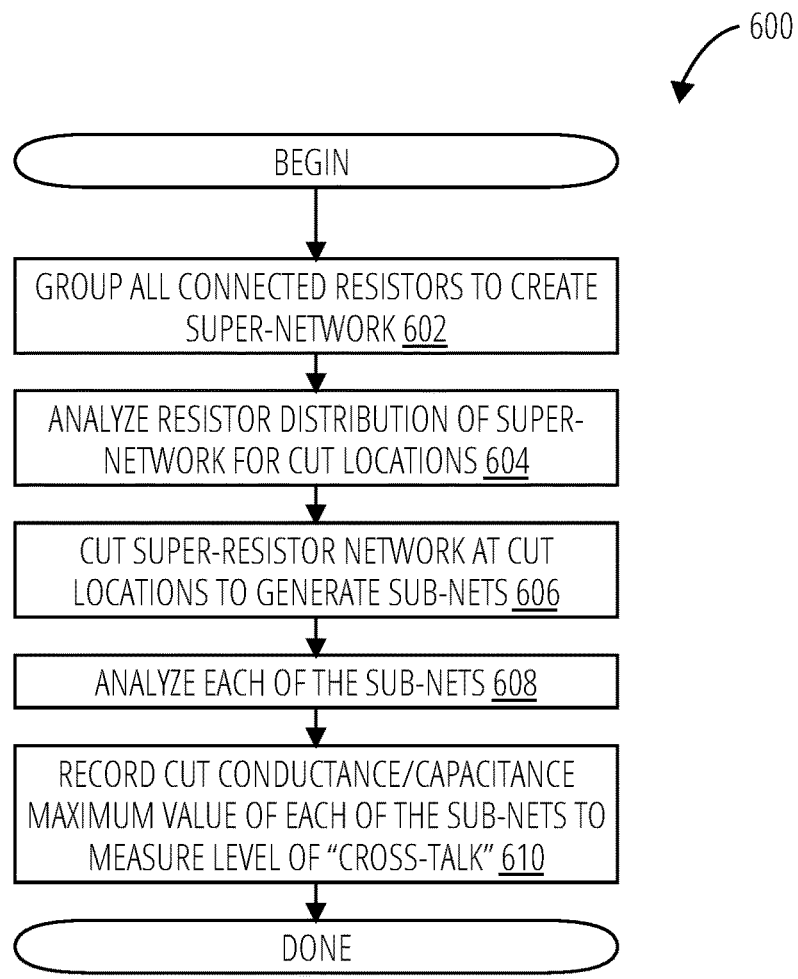
FIG. 6 illustrates a cross-talk reduction process 600 in accordance with one embodiment.

FIG. 5 depicts a simplified version of pre- and post-layouts 500 with only the resistors included where RC network 504 represents a resistor-connected network, as an example for the following embodiment. FIG. 5 depicts a pre-layout 506 and post-layout circuit 508, with a cutline illustrating how to partition the post-layout circuit to minimize cross-talk. In one of the embodiments disclosed herein, a cross-talk reduction process 600 (see FIG. 6) is used to minimize the problem of cross-talk among sub-circuits, as described below. It creates the same number of blocks of pre-layout in this post-layout partitioning.

Step 602: Group all of the connected resistors to create a super-network.

Step 604: Analyze the resistor distribution of this super-network to decide how to cut so that it evolves to a similar pre-layout 506 as shown on the left-hand side of FIG. 5. The pre-layout is treated as a reference.

Step 606: Perform the analysis of Step 604 for each sub-net of the post-layout 508.

Step 608: Record the cut conductance/capacitance maximum value of each sub-net to measure the level of "cross-talk".

Figure 7:
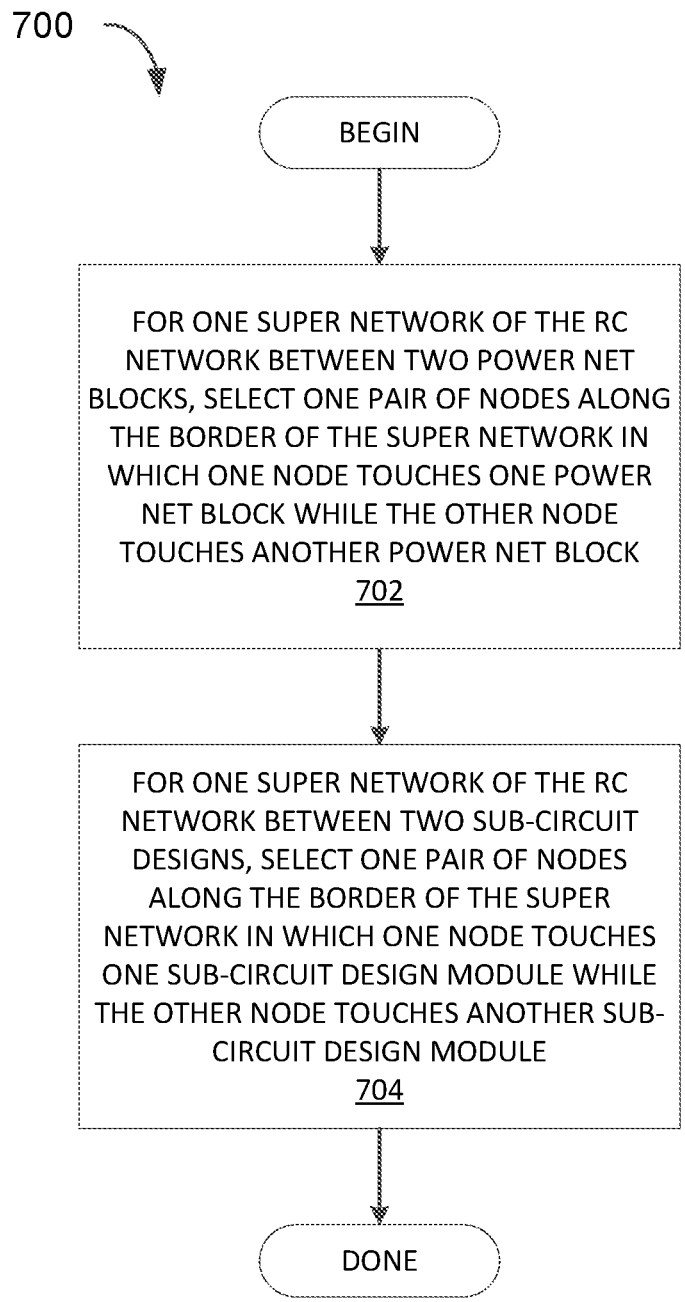
FIG. 7 illustrates a coupling analysis 700 in accordance with one embodiment.

To calculate resistor/capacitor coupling between different power net blocks which drive different sub-circuits, and resistor/capacitor coupling between sub-circuits, a coupling analysis 700 process for example as illustrated in FIG. 7 may be utilized for each super network of an RC network.

Step 702: For one super network of the RC network between two power net blocks, one pair of nodes is selected along the border of the super network in which one node touches one power net block, while the other node touches another power net block. The simulator calculates efficient resistance or efficient capacitance between these two nodes as a coupling measurement between these two power net blocks.

Step 704: For one super network of the RC network between two sub-circuit designs, one pair of nodes is selected along the border of this super network in which one node touches one sub-circuit while the other node touches another sub-circuit. Then the simulator calculates efficient resistance or efficient capacitance between these two nodes as a coupling measurement between these two sub-circuits.

In Step 702 and Step 704, the two nodes are selected arbitrarily in each super network so that the maximum coupling of the super net is obtained.

Figure 8:
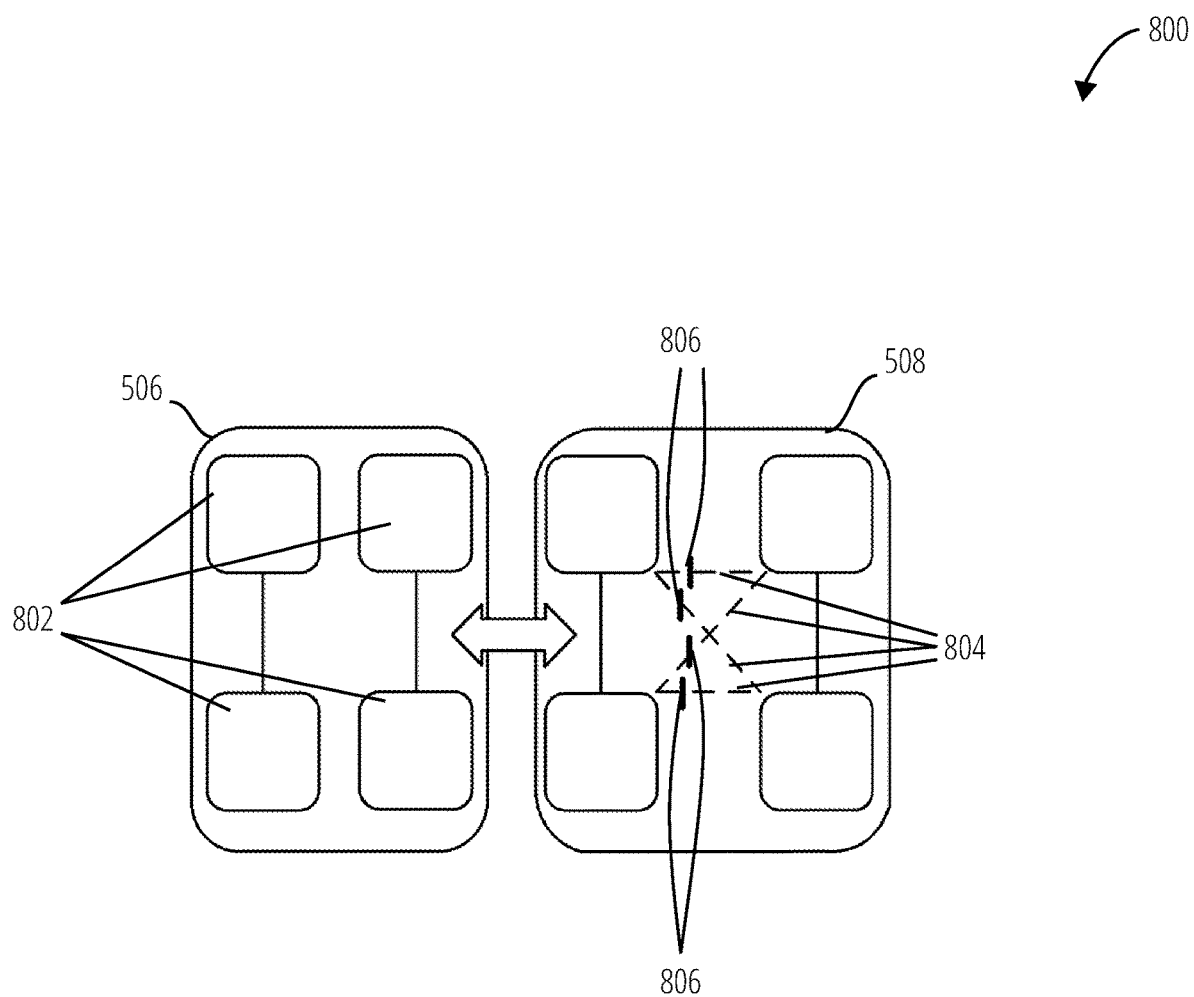
FIG. 8 illustrates a detail of pre-layout and post-layout 800 in accordance with one embodiment.
Figure 9:
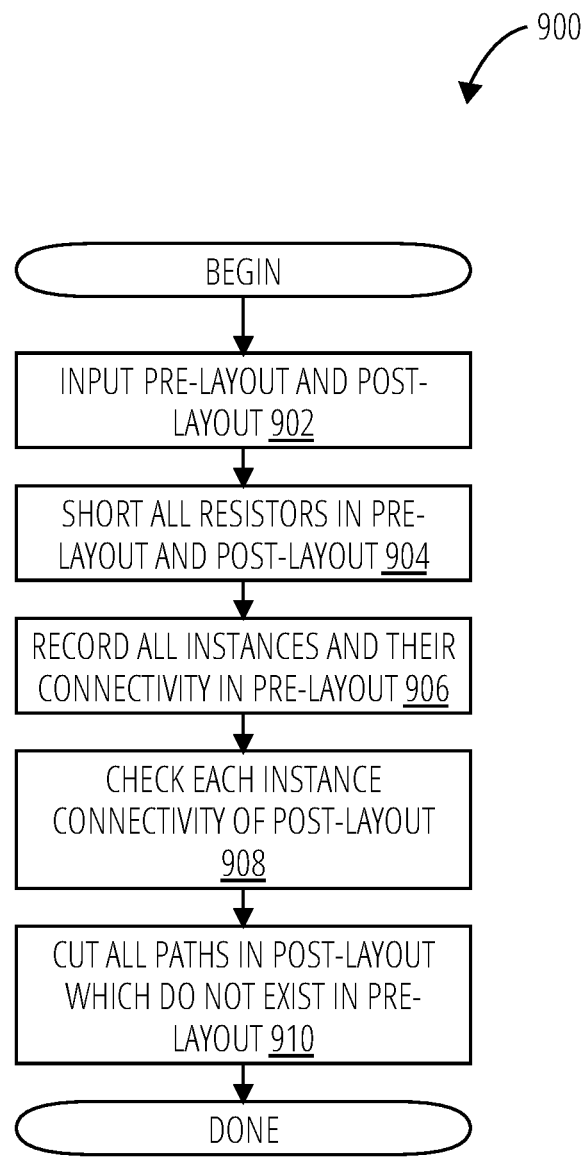
FIG. 9 illustrates an analysis process 900 in accordance with one embodiment.

An embodiment of the analysis process of Step 604 is now described in more detail. FIG. 8 is a simplified version of FIG. 5, showing a pre- and post-layout 800 including four instances 802 which do not result from RC extraction and exist in the original design, and their connectivity as the circuit layout evolves from pre-layout 506 to post-layout 508. FIG. 8 depicts cuts in a post-layout circuit for RC edges that do not exist in the pre-layout circuit. As illustrated in FIG. 9, the analysis process 900 may be carried out as described below.

Step 902: Input both net-lists of pre-layout and post-layout for a circuit simulator.

Step 904: Short all resistors in both pre-layout and post-layout formats under an assumption that the circuit only has resistors in RC networks.

Step 906: For the pre-layout format, record all the instances and their connectivity.

Step 908: For the post-layout format, check each instance and its connectivity.

Step 910: Cut all of the paths 804 which do not exist in the pre-layout format as shown on the right-hand side of FIG. 8, where the heavy vertical lines represents the cuts 806. The "cut" technique can use a Min-Cut algorithm or others from conventional graph theory.

The difficulty in partitioning post-layout circuits is due to "big" nodes, which refers to the nodes connecting to a large number of other nodes through current paths of adjacent instances in the circuit connectivity. The existing partitions in the fast-SPICE tools for post-layout circuits are either node-based or instance-based. In some of the embodiments disclosed herein, a hybrid alternative partitioning between node-based and instance-based approaches is used.

The improved partition algorithm applies the consistency between pre-layout and post-layout formats for the same circuit design. Due to the RC "cuts", discussed above, between power net blocks or between different sub-circuits in a post-layout circuit, the post-layout includes additional driving-load or parent-child relationships in comparison to the pre-layout design. "Additional" means that the relationship is a result of either RC extraction (originally) or RC reduction (artificially).

For example, consider when a circuit is partitioned into two adjacent blocks A and B and coupling exists between these two blocks through currents through either resistors or capacitors. Three possible coupling relationships exist:

1. Block A drives block B, which means that Block B is a load or a child of Block A.
2. Block B drives block A, which means that Block A is a load or a child of Block B.
3. Block A and Block B drive each other.

These relationships are also called a driving-load or parent-child relationships.

In a fast-SPICE tool, a simulation strategy can decide how to simulate a circuit based on detecting different circuit causal relations. For example, in the last example of block A and block B, if Block A drives Block B, then the simulation calculates Block A first and then calculates Block B. If the simulation detection learns that they drive each other, then either block A or block B may be calculated first. The existing partition algorithms cannot provide such consistency between pre-layout and post-layout formats for the same circuit design.

Conventional analysis techniques focus on how to reduce RC networks to make huge net-lists significantly smaller. This improves a simulation tool's performance, but at the expense of sacrificing some accuracy. These existing RC reduction techniques attempt to reduce the number of ports or internal nodes of each RC net. Each RC net is converted into an RC model that is a smaller and denser RC matrix for circuit simulation.

In some of the embodiments disclosed herein, RC networks are cut to indicate their relationship between pre-layout and post-layout formats. Where needed, RC reduction is applied only inside partitioned blocks. This RC reduction guarantees that a large block only occurs due to a similar post-layout to pre-layout design has large RC networks, or due to the pre-layout circuit design intrinsically has large blocks.

The next step in partitioning is to use tools such as Patoh, hMETIS, or an order ranked hierarchical partition method that can be applied to the large blocks in both pre-layout and post-layout net-lists simultaneously.

Figure 10:
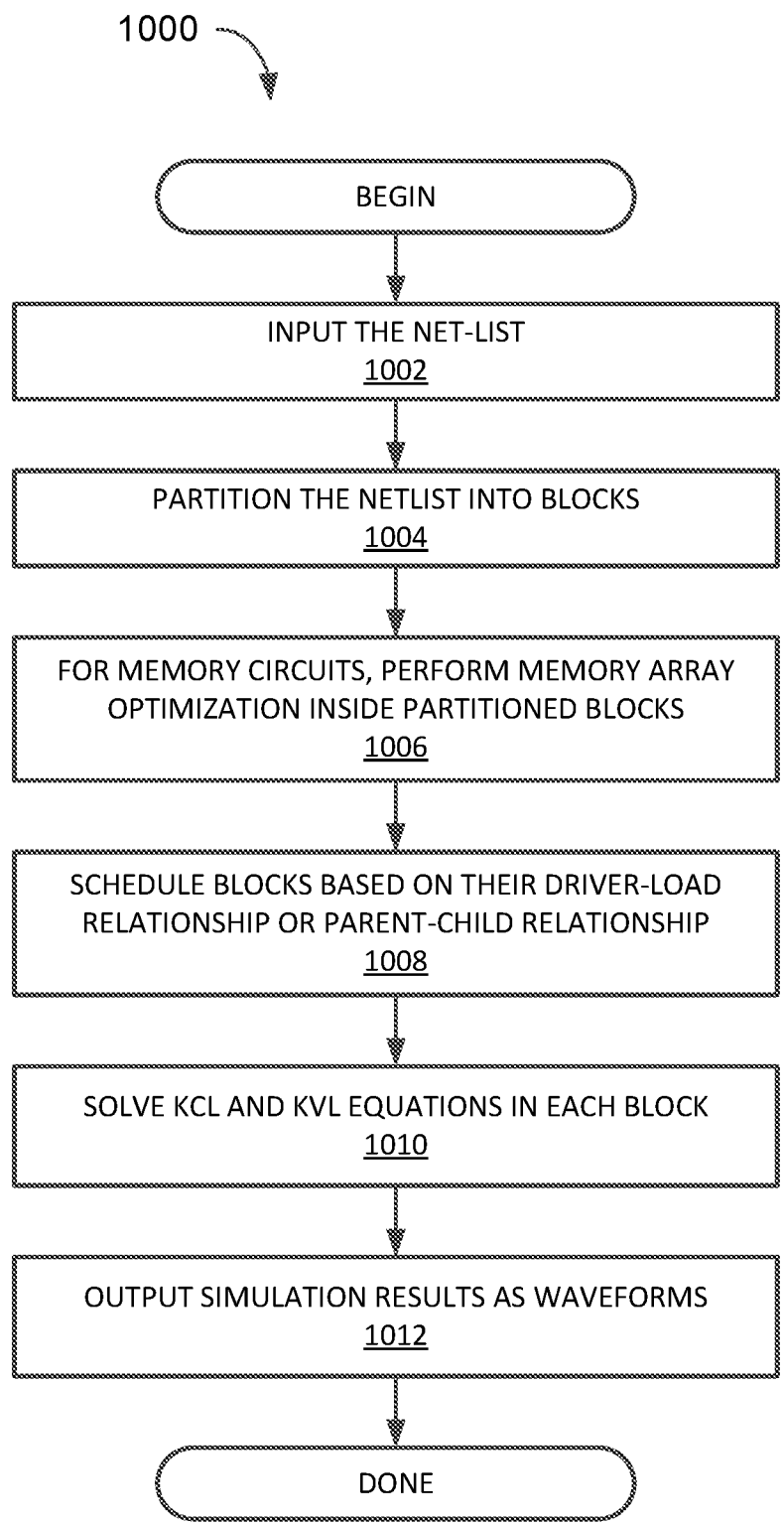
FIG. 10 illustrates a circuit simulation process 1000 in accordance with one embodiment.

With fast-SPICE tools a circuit simulation process 1000 (see FIG. 10) may be carried out using the algorithms disclosed herein as follows:

Step 1002: Input circuit information from a netlist with a certain format, for example HSPICE format or ELDO, and build up either a flattened or a hierarchical database to store all the netlist information, including circuit connectivity, SPICE models, RC network, etc. as required by a module such as the simulation engine.

Step 1004: Based on circuit connectivity, SPICE models, and RC networks, partition the circuit into blocks in accordance with the circuit partition process 300 illustrated in FIG. 3. For memory designs, this may involve some memory array optimization (Step 1006) inside the partitioned blocks for achieving better partitioning.

Step 1008: Schedule blocks based on their driver-load relationship, or parent-child relationship.

Step 1010: Solve the KCL and KVL equations in each block.

Step 1012: Output simulation results as waveforms in a particular format.

FIG. 11 illustrates a schematic circuit partition 1100 result using the partition algorithms disclosed herein. FIG. 11 depicts a post-layout partitioning with cuts between sub-circuits. Based on the cross-talk resistance threshold, an additional cut 1102 is made in the partitioning. The two sub-circuits (1124, 1126) have two different power net drivers, including power net block 1104, and power net block 1106, respectively. After partitioning, there are ten blocks resulting from partitioning the circuit shown in FIG. 11: a rail block 1108, three power net blocks (power net block 1104, power net block 1106, and power net block 1110), and six signal blocks (signal block 1112, signal block 1114, signal block 1116, signal block 1118, signal block 1120, and signal block 1122). In a preferred mode the circuit partition 1100 is solved block by block, sub-circuit by sub-circuit.

Following the general rules of block solving in a fast-SPICE tool, the rail block 1108 is solved first. Next, the power net block 1110 is solved which is driving the two signal sub-circuits simultaneously. After this, each sub-circuit is solved one by one. Every sub-circuit has its own unshared power net block which is solved for first, then each signal block is solved. For sub-circuit 1126, the three signal blocks are solved in driving order: signal block 1118, then signal block 1120, and then signal block 1122. The simulation results may be output through a setup channel.

The partitioning techniques disclosed herein enable local sub-circuit simulation for the post-layout. Using sub-circuit simulation, a designer can isolate one or several sub-circuits from a whole circuit design to calculate the behaviors of local sub-circuit behaviors, such as power distribution, timing, delay, or leakage current. The disclosed partitioning techniques also enable the analysis of interactions between adjacent sub-circuits, achieving many benefits and efficiencies while reducing global simulation time.

The "cross-talk" between different power net blocks (which drive different sub-circuits), and the "cross-talk" between sub-circuits may be checked as further described below.

With the partitioning algorithms disclosed herein, it is possible to determine the evolution from pre-layout RC extraction to post-layout RC reduction, or vice versa, because each process can apply different approximation levels. Using this approach, the designer may apply an original circuit design to the simulation of a similar but somewhat different circuit, using a similar partitioning for both the pre-layout and the post-layout circuits. The designer can thus ascertain how their design evolves from pre-layout to post-layout.

Figure 12:
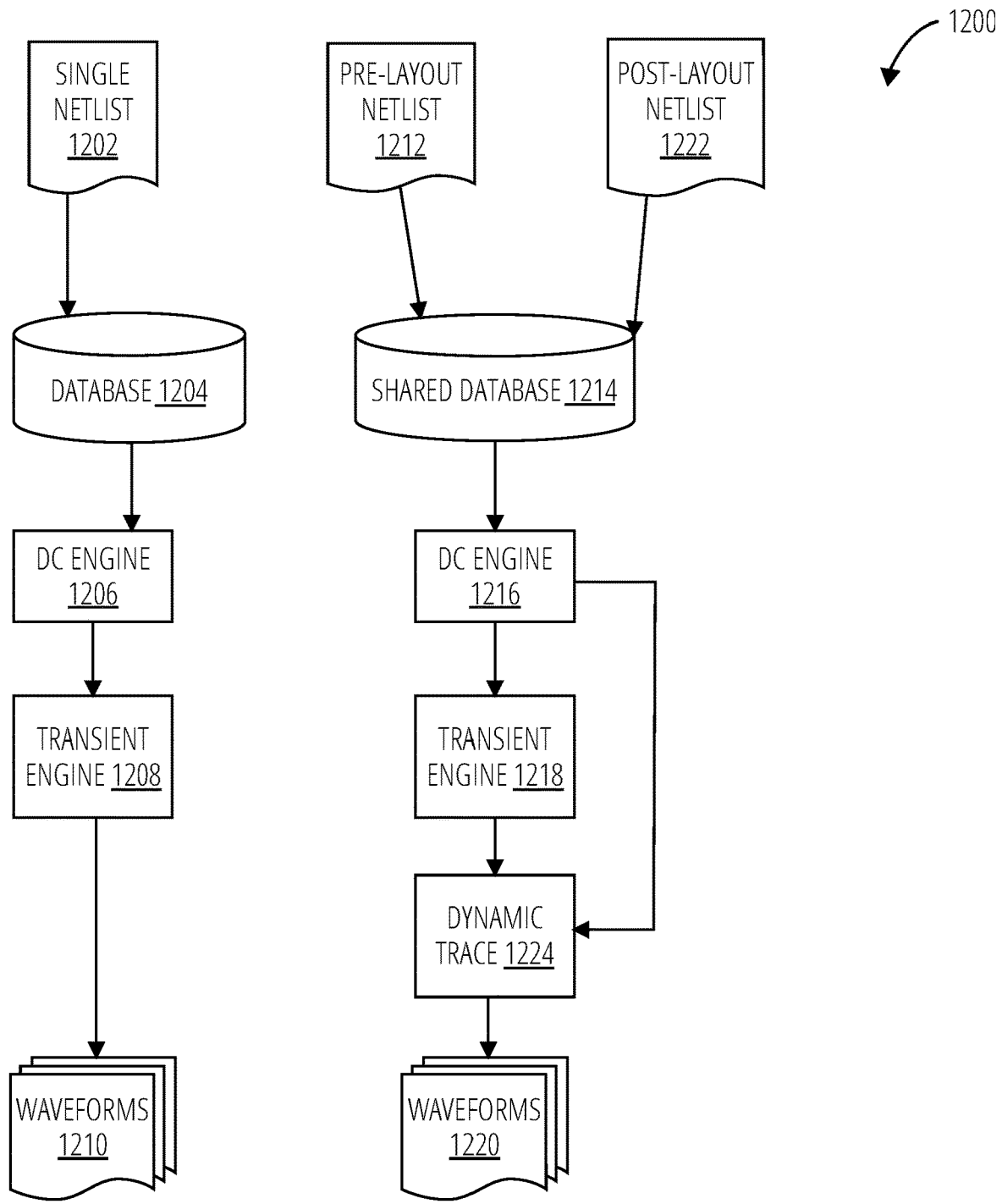
FIG. 12 illustrates a parallel simulation 1200 in accordance with one embodiment.

In the description of FIG. 1 through FIG. 11, the impact of capacitances on the circuits is ignored by the algorithms. However, the described approaches are easily expanded to include capacitors. Mathematically, current flowing through resistors is similar to current flowing through capacitors. The main difference is that the current equation formations are based on matrix stamping, where after the model evaluation, all needed data is added to the solved matrix. FIG. 12 depicts a structure for parallel simulation 1200 of pre-layout and post-layout circuits as represented by netlists. In some of the embodiments disclosed herein, both a pre-layout netlist 1212 and a post-layout netlist 1222 of the same circuit design are loaded at the same time, as shown in the right-hand side of FIG. 12, and a shared database 1214 is constructed for all the pre-layout and post-layout circuit information, respectively. As a comparison, the left-hand side of FIG. 12 illustrates a conventional circuit simulation flow, while the right-hand side illustrates a circuit simulation flow in accordance with the algorithms disclosed herein.

In the conventional process, a single netlist 1202 produces a database 1204 for a module (the DC engine 1206), which outputs to another module (the transient engine 1208), which generates the output waveforms 1210. The DC engine 1206 solves the D.C. (direct current) circuit behavior, which is provided to the transient engine 1208, which solves a time-dependent matrix to produce voltages and currents for each net of the circuit at each discrete step of time resolution. Most of circuit simulators for DC and transient solvers use the same data structure, the same partition rules, etc. A product known as CustomSIM separates the DC engine from transient engine 1208. It provides the DC engine more options to manipulate different partition algorithms.

In the new process, both the pre-layout netlist 1212 and the post-layout netlist 1222 use a shared database 1214, which is provided to the DC engine 1216 and optionally to the transient engine 1218. In the shared database 1214, a comparison between the pre-layout netlist 1212 and the post-layout netlist 1222 is performed, which includes RC extraction. Processing of the pre-layout netlist 1212 and the post-layout netlist 1222 are simulated in parallel and share data with one other. For example, pre-layout simulation may execute in one execution thread while post-layout simulation executes in a second execution thread, in parallel. The netlist simulation, including shared data, is provided to the DC engine 1216 to solve for DC circuit behaviors. Depending on the need for transient analysis, the transient engine 1218 step may be bypassed. If needed, the results of the DC engine 1216 are provided to the transient engine 1218 for analysis of time-dependent behaviors. The results from either the DC engine 1216 or the transient engine 1218 between the simulation result of the pre-layout netlist and the post-layout netlist are traced dynamically (to identify broken connections or sources of inefficiency) by the dynamic trace 1224 algorithm. Output is produced as a waveform 1220.

The local sub-circuit simulation results in a post-layout circuit simulation performance with the same or equivalent speed as pre-layout simulation. With semiconductor technology, more and more parasitic resistors and capacitors enter the post-layout netlist which leads to a slower and slower simulation performance of a post-layout circuit. Thus, the designer needs more time to extract post-layout circuit information. To decrease the design cycle time, it is necessary to reduce circuit simulation time. Local sub-circuit simulation is an alternative to reduce simulation time because the designer only needs to know local information of the post-layout circuit instead of global information.

Because the new simulation flow depicted on the right-hand side of FIG. 12 includes a shared database 1214 for both pre-layout and post-layout, pre-layout simulation can be done first to provide all stimulus of inputs for local sub-circuit designs to do local post-layout sub-circuit simulation. This is a form of quasi-synchronized circuit simulation between pre-layout and post-layout. It can significantly speed up post-layout simulation to obtain necessary circuit function checks, behavior checks, and property checks of a circuit design.

Figure 13:
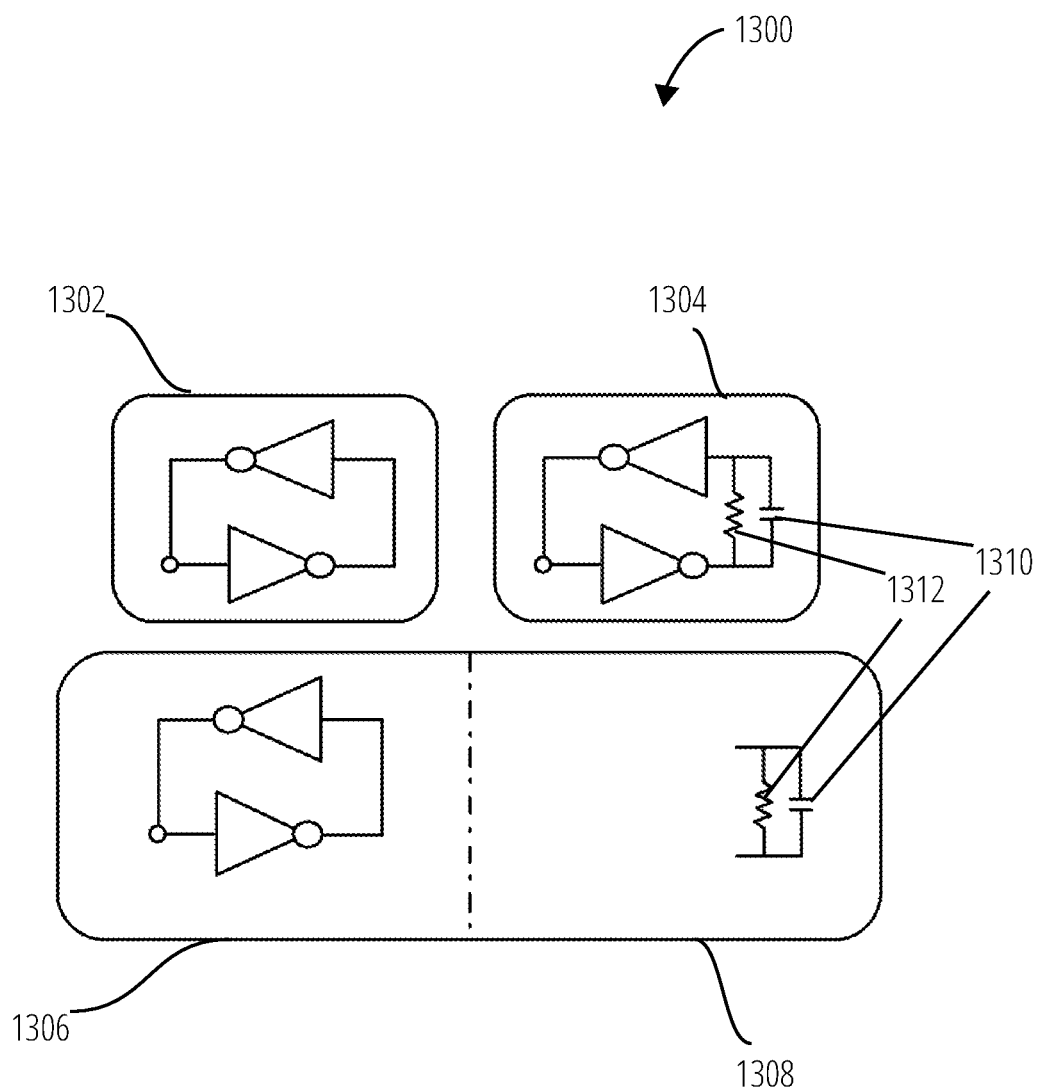
FIG. 13 illustrates a latch 1300 in accordance with one embodiment.

FIG. 13 depicts how information on similar circuits can be shared in the parallel environment of FIG. 12. An example of a simple latch 1300 of inverters is depicted in FIG. 13. There is a pre-layout netlist 1302 and a post-layout netlist 1304 for the latch 1300, with the latter comprising one resistor 1312 and one capacitor 1310. The pre-layout database 1306 and post-layout database 1308 are combined to form an embodiment of the shared database 1214.

Figure 14:
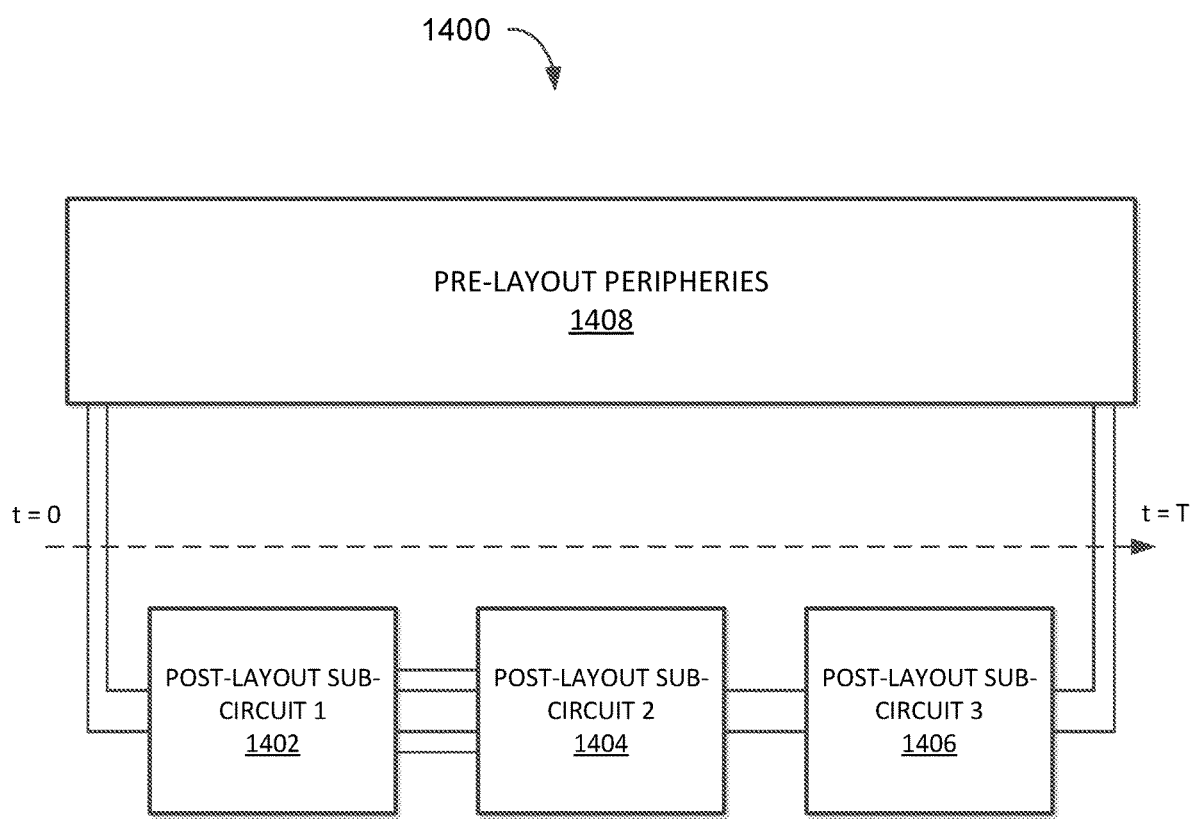
FIG. 14 illustrates a synchronized simulation between pre-layout and post-layout 1400 in accordance with one embodiment.

FIG. 14 is an example of a synchronized simulation 1400, which includes three post-layout adjacent simulation modules (post-layout sub-circuit 1402, post-layout sub-circuit 1404, and post-layout sub-circuit 1406). FIG. 14 depicts a post-layout module simulation driven by pre-layout peripheries, wherein "pre-layout peripheries" refers to other parts of the circuit except the three post-layout sub-circuits (1402, 1404, 1406).

Pre-layout and post-layout simulations are synchronized as previously described. However, the pre-layout simulation time always lead ahead of the post-layout time to an extent that the post-layout modules can use all of the driving information available on the pre-layout peripheries 1408 from the pre-layout simulation.

Figure 15:
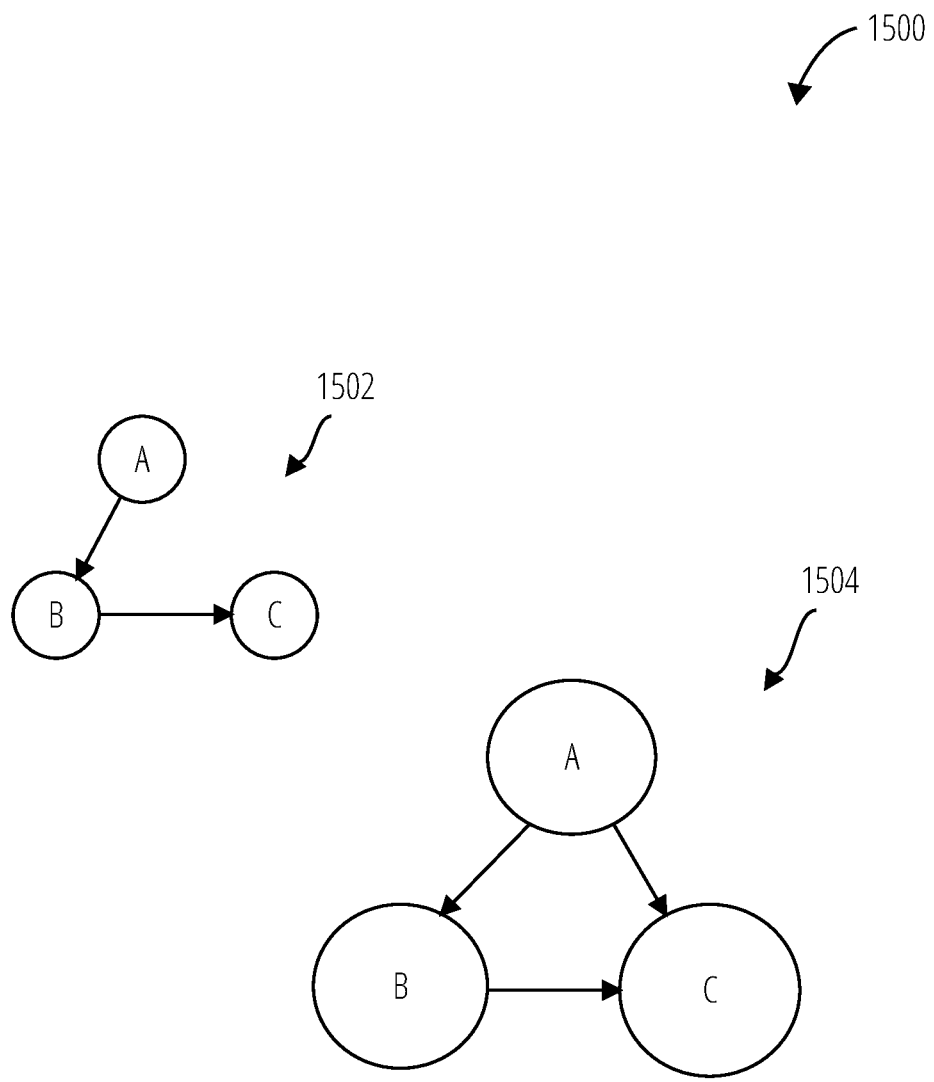
FIG. 15 illustrates an information flow 1500 in accordance with one embodiment.

FIG. 15 depicts an information flow between modules in a post-layout simulation 1500. FIG. 15 is an example of calculating inputs of module C during local post-layout circuit simulation. In the pre-layout 1502, module C is only driven by module B. Thus, at any time, the algorithm needs to first calculate the post-layout of module A and module B, based on data for both module A and module B from the pre-layout 1502. Then, the algorithm can calculate the post-layout of module C, and output waveforms. In the post-layout 1504, module C is driven by both module A and module B, due to RC extraction.

Conventional circuit simulation tools cannot determine the source of root-cause for errors in simulation results. These conventional tools only know about "global" design problems, not "local" design problems. The herein described local sub-circuit simulation approach between pre-layout and post-layout can clearly identify the root-causes (local module) of simulation errors.

Figure 16:
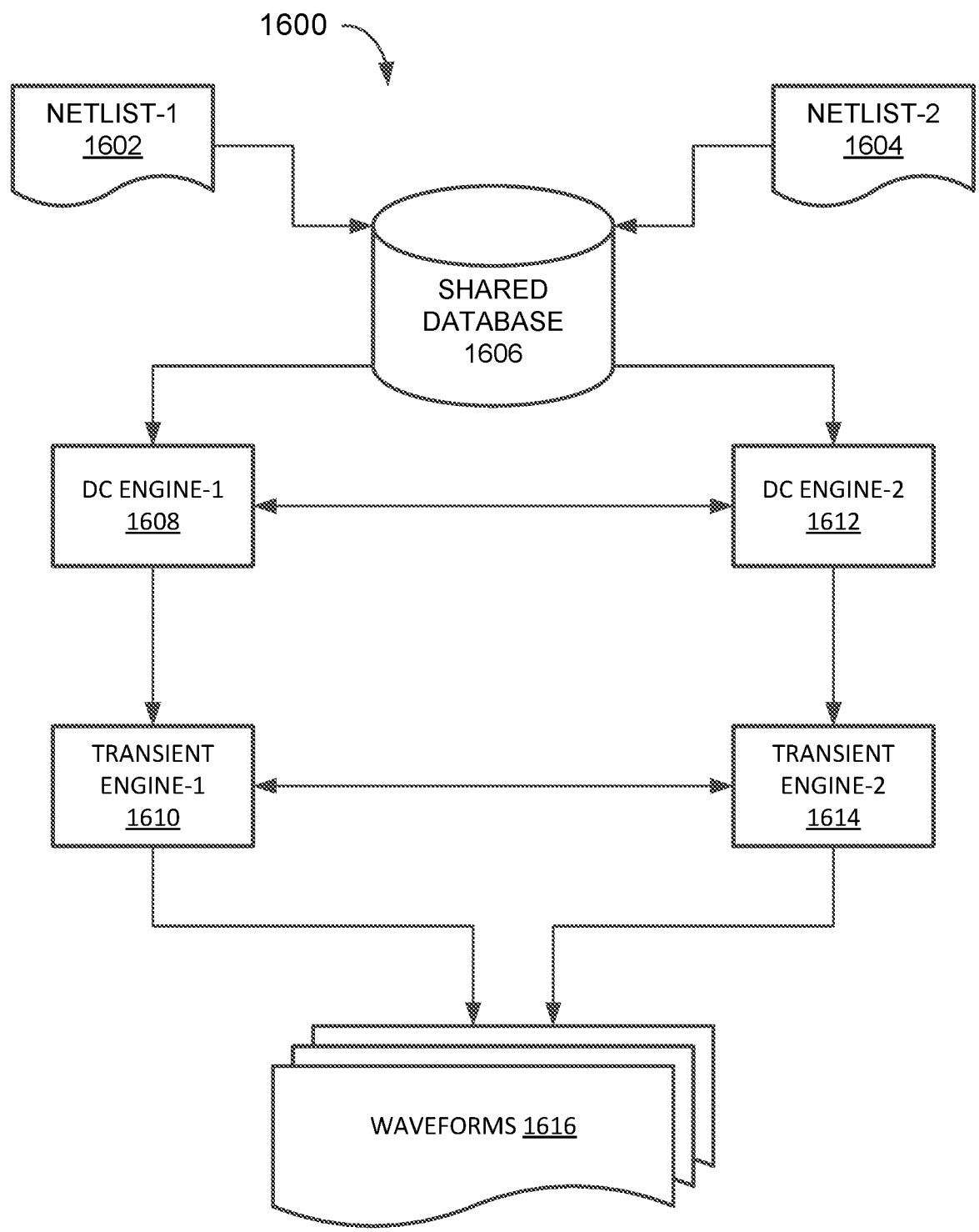
FIG. 16 illustrates a reference circuit simulation 1600 in accordance with one embodiment.

FIG. 16 depicts a simulation workflow diagram on how to use a shared simulation database to share data between simulations of two simulation circuits. In one embodiment, the technique of "local sub-circuit simulation" is extended into a technique for "reference circuit simulation" for post-layout circuits. Often, a new circuit design is based on previously known designs. For example, when process technology advances from 7 nm to 5 nm for MOSFET, designers often borrow many circuit parts from previous libraries of 7 nm circuits to use for the 5 nm circuit design, so as to speed up the design cycle. FIG. 16 illustrates a flow diagram for a reference circuit simulation 1600.

In FIG. 16, netlist-1 1602 is a known design, while netlist-2 1604 is a new design. Both netlists can be entered into a shared database 1606 if the two designs are very close. For instance, this may be done if their connectivity is the same while only the transistor models are different, e.g., a reference design uses 7 nm MOSFET technology while a new design uses 5 nm MOSFET technology. Paralleled simulations of both designs can check, refer, and share information with each other to report how and why the new design is changing from the old one.

Thus, simulation using the netlist-1 1602 is carried out using DC engine-1 1608 and transient engine-1 1610. While in parallel, the simulation of netlist-2 1604 is carried out using DC engine-2 1612 and transient engine-2 1614. Note the double-arrow in FIG. 16 connecting DC Engine-1 1608 and DC Engine-2 1612. During simulation, information is shared between DC Engines 1608 and 1612, and differences are recorded. Likewise, there is a double-arrow connecting Transient Engine-1 1610 and Transient Engine-2 1614. Information is shared between Transient Engines 1610 and 1614 during simulation, and differences are recorded. The output waveforms 1616 from each simulation may likewise be compared for differences.

Figure 17:
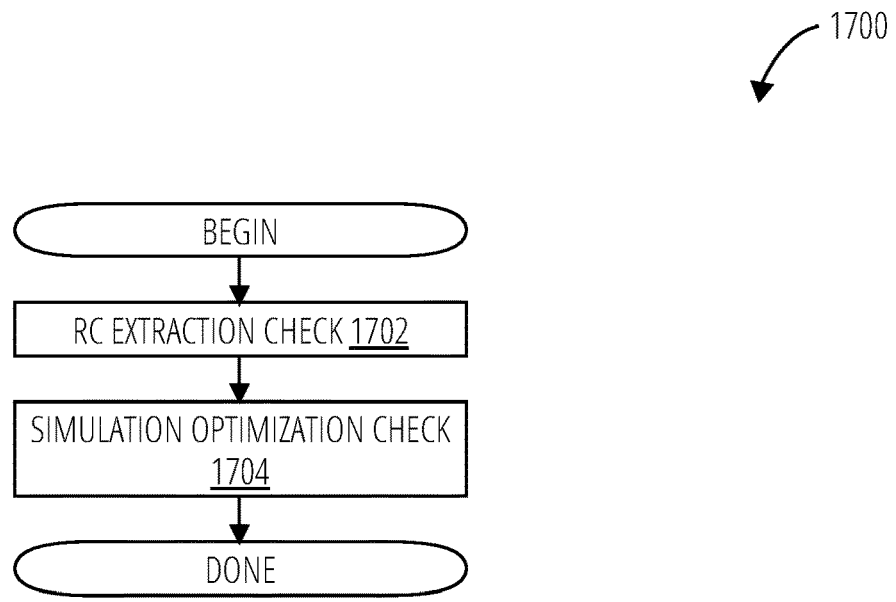
FIG. 17 illustrates a root cause analysis 1700 in accordance with one embodiment.

To distinguish the causes between RC extraction and the front-end RC network optimization in a fast-SPICE tool, an RC optimization process 1700 such as illustrated in FIG. 17 may be used.

Step 1702: Check RC network impact between different power net blocks and between sub-circuits, with all of the RC reductions turned off in a fast-SPICE tool.

After no problems are found in block 1702, proceed to Step 1704 and check RC network impact between different power net blocks and between sub-circuits, and turn on all of the RC reductions in the fast-SPICE tool.

DETAILED DESCRIPTION—TECHNOLOGY SUPPORT GENERAL COMPUTER EXPLANATION

Figure 19:
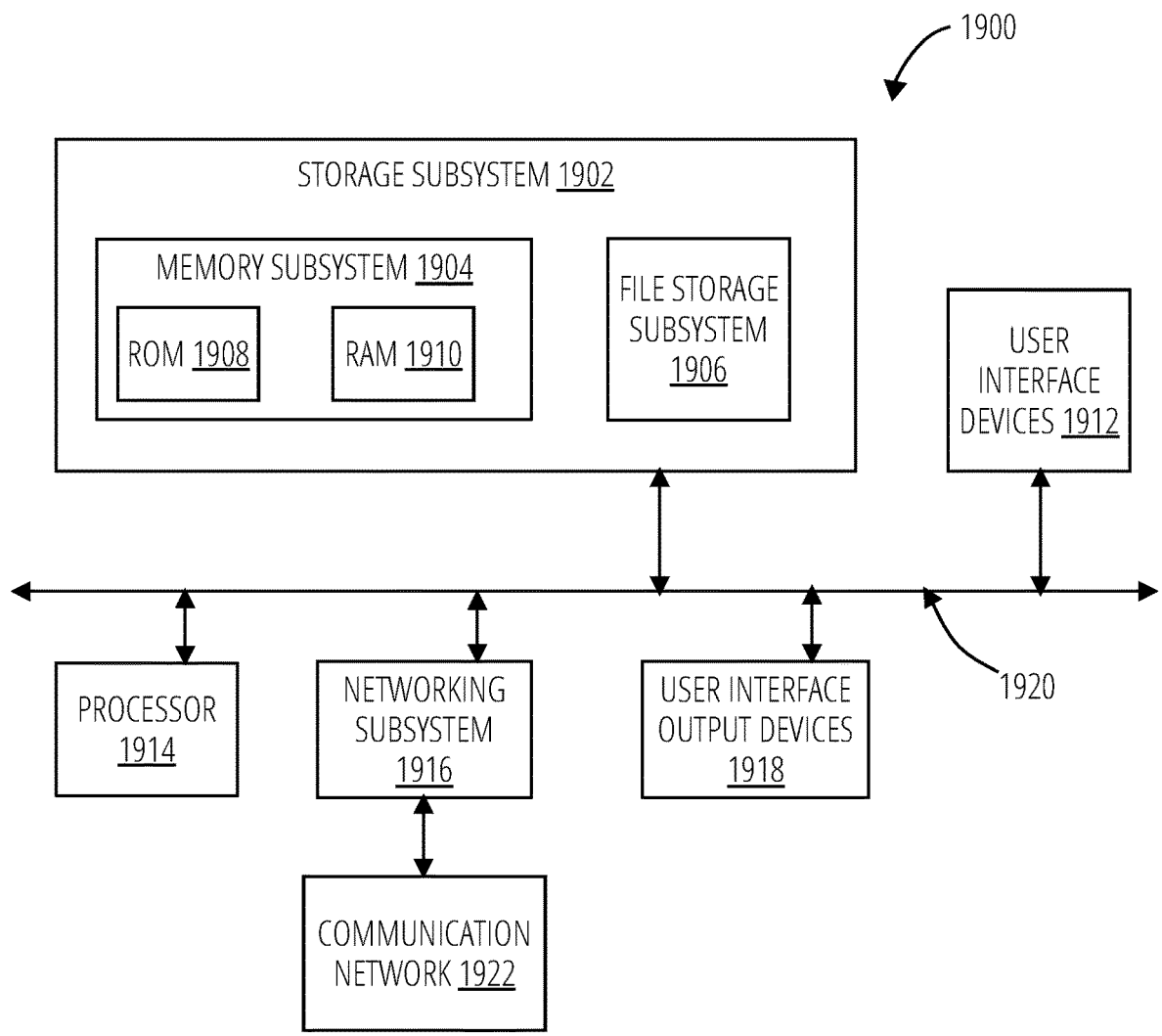
FIG. 19 illustrates a computing system 1900 suitable for use with embodiments of the disclosed technology, as well as circuit design and circuit embodiments of the technology.
Figure 20:
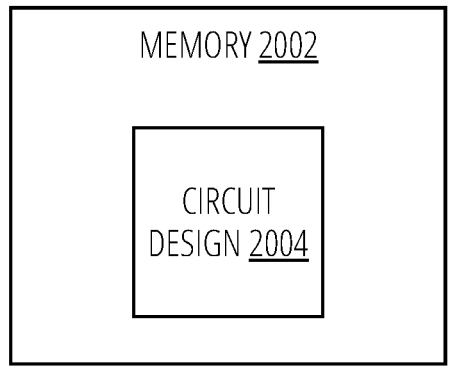
FIG. 20 illustrates a memory 2002 in accordance with one embodiment.
Figure 21:
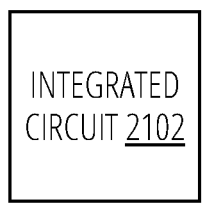
FIG. 21 illustrates an integrated circuit 2102 in accordance with one embodiment.

FIGS. 19, 20 and 21 are simplified block diagrams of a computer system suitable for use with embodiments of the technology, as well as circuit design and circuit embodiments of the technology.

In FIG. 19, computer system 1900 typically includes at least one computer or processor 1914 which communicates with a number of peripheral devices via bus subsystem 1912. Typically, the computer can include, or the processor can be, any of a microprocessor, graphics processing unit, or digital signal processor, and their electronic processing equivalents, such as an Application Specific Integrated Circuit (ASIC) or Field Programmable Gate Array (FPGA). The terms 'processor' and 'computer' are further defined below. These peripheral devices may include a storage subsystem 1902, comprising a memory subsystem 1904 and a file storage subsystem 1906, user interface input devices 1912, user interface output devices 1918, and a network interface subsystem 1916. The input and output devices allow user interaction with computer system 1900.

The computer system may be a server computer, a client computer, a workstation, a mainframe, a personal computer (PC), a tablet PC, a set-top box (STB), a personal digital assistant (PDA), a cellular telephone, a smartphone, a web appliance, a rack-mounted "blade", a kiosk, a television, a game station, a network router, switch or bridge, or any data processing machine capable of executing instructions (sequential or otherwise) that specify actions to be taken by that machine.

The computer system typically includes an operating system, such as Microsoft's Windows, Sun Microsystems's Solaris, Apple Computer's MacOs, Linux or Unix. The computer system also typically can include a Basic Input/Output System (BIOS) and processor firmware. The operating system, BIOS and firmware are used by the processor to control subsystems and interfaces connected to the processor. Typical processors compatible with these operating systems include the Pentium and Itanium from Intel, the Opteron and Athlon from Advanced Micro Devices, and the ARM processor from ARM Holdings.

Innovations, embodiments and/or examples of the claimed inventions are neither limited to conventional computer applications nor the programmable apparatus that run them. For example, the innovations, embodiments and/or examples of what is claimed can include an optical computer, quantum computer, analog computer, or the like. The computer system may be a multi processor or multi-core system and may use or be implemented in a distributed or remote system. The term 'processor' here is used in the broadest sense to include a singular processor and multi-core or multi-processor arrays, including graphic processing units, digital signal processors, digital processors and combinations of these devices. Further, while only a single computer system or a single machine may be illustrated, the use of a singular form of such terms shall also signify any collection of computer systems or machines that individually or jointly execute instructions to perform any one or more of the sets of instructions discussed herein. Due to the ever-changing nature of computers and networks, the description of computer system 1900 depicted in FIG. 19 is intended only as one example for purposes of illustrating the preferred embodiments. Many other configurations of computer system 1900 are possible having more or less components than the computer system depicted in FIG. 19.

Network interface subsystem 1916 provides an interface to outside networks, including an interface to communication network 1922, and is coupled via communication network 1922 to corresponding interface devices in other computer systems or machines. Communication network 1922 may comprise many interconnected computer systems, machines and communication links. These communication links may be wireline links, optical links, wireless links, or any other devices for communication of information. Communication network 1922 can be any suitable computer network, for example a wide area network such as the Internet, and/or a local area network such as Ethernet. The communication network can be wired and/or wireless, and the communication network can use encryption and decryption methods, such as is available with a virtual private network. The communication network uses one or more communications interfaces, which can receive data from, and transmit data to, other systems. Embodiments of communications interfaces typically include an Ethernet card, a modem (e.g., telephone, satellite, cable, or ISDN), (asynchronous) digital subscriber line (DSL) unit, Firewire interface, USB interface, and the like. One or more communications protocols can be used, such as HTTP, TCP/IP, RTP/RTSP, IPX and/or UDP.

User interface input devices 1912 may include an alphanumeric keyboard, a keypad, pointing devices such as a mouse, trackball, touchpad, stylus, or graphics tablet, a scanner, a touchscreen incorporated into the display, audio input devices such as voice recognition systems or microphones, eye-gaze recognition, brainwave pattern recognition, and other types of input devices. Such devices can be connected by wire or wirelessly to a computer system. In general, use of the term "input device" is intended to include all possible types of devices and ways to input information into computer system 1900 or onto communication network 1922. User interface input devices typically allow a user to select objects, icons, text and the like that appear on some types of user interface output devices, for example, a display subsystem.

User interface output devices 1918 may include a display subsystem, a printer, a fax machine, or non-visual displays such as audio output devices. The display subsystem may include a cathode ray tube (CRT), a flat-panel device such as a liquid crystal display (LCD), a projection device, or some other device for creating a visible image such as a virtual reality system. The display subsystem may also provide non-visual display such as via audio output or tactile output (e.g., vibrations) devices. In general, use of the term "output device" is intended to include all possible types of devices and ways to output information from computer system 1900 to the user or to another machine or computer system.

Memory subsystem 1904 typically includes a number of memories including a main random-access memory (RAM) 1910 (or other volatile storage device) for storage of instructions and data during program execution and a read only memory (ROM) 1908 in which fixed instructions are stored. File storage subsystem 1906 provides persistent storage for program and data files, and may include a hard disk drive, a floppy disk drive along with associated removable media, a CD-ROM drive, an optical drive, a flash memory, or removable media cartridges. The databases and modules implementing the functionality of certain embodiments may be stored by file storage subsystem 1906.

Bus subsystem 1920 provides a device for letting the various components and subsystems of computer system 1900 communicate with each other as intended. Although bus subsystem 1920 is shown schematically as a single bus, alternative embodiments of the bus subsystem may use multiple busses. For example, RAM-based main memory can communicate directly with file storage systems using Direct Memory Access (DMA) systems.

FIG. 20 depicts a memory 2002 such as a non-transitory, computer readable data and information storage medium associated with file storage subsystem 1906, and/or with network interface subsystem 1916, and can include a data structure specifying a circuit design. The memory 2002 can be a hard disk, a floppy disk, a CD-ROM an optical medium, removable media cartridge, or other medium that stores computer readable data in a volatile or non-volatile form. Software read into a computer from such a memory can be converted at a selected instance in time from a tangible form to a transmission signal that is propagated through a medium (such as a network, connector, wire, or trace as an electrical pulse or a medium such as space or an atmosphere as electromagnetic radiation with wavelengths in the electromagnetic spectrum longer than infrared light).

FIG. 20 signifies an integrated circuit 2102 created with the described technology that includes one or more cells selected, for example, from a cell library.

DETAILED DESCRIPTION—TECHNOLOGY SUPPORT HARDWARE/SOFTWARE EQUIVALENCE

Some of the innovations, embodiments and/or examples described herein comprise and/or use a processor, such as processor 1914 in FIG. 19. As used herein, the term 'processor' signifies a tangible data and information processing device that physically transforms data and information, typically using a sequence of transformations (also referred to as 'operations'). Data and information can be physically represented by an electrical, magnetic, optical or acoustical signal that is capable of being stored, accessed, transferred, combined, compared, or otherwise manipulated by the processor. The term "processor" can signify a singular processor and multi-core systems or multi processor arrays, including graphic processing units, digital signal processors, digital processors or combinations of these elements.

The processor can be electronic, for example, comprising digital logic circuitry (for example, binary logic), or analog (for example, an operational amplifier). The processor can also be non-electronic, for example, as seen in processors based on optical signal processing, DNA transformations or quantum mechanics, or a combination of technologies, such as an optoelectronic processor. For data and information structured in binary form, any processor that can transform the data and information using the AND, OR and NOT logical operations (and their derivatives, such as the NAND, NOR, and XOR operations) can transform the data and information using any function of Boolean logic. A processor such as an analog neural network processor can also transform data and information non-digitally. No scientific evidence exists that any of these processors are processing, storing and retrieving data and information, in any manner or form equivalent to the bioelectric structure of the human brain.

The one or more processors may also operate to support performance of the relevant operations in a 'cloud computing' environment or as a 'software as a service' (SaaS). For example, at least some of the operations may be performed by a group of processors available at a distributed or remote system, these processors accessible via a communications network (e.g., the Internet) and via one or more software interfaces (e.g., an application program interface (API).)

As used herein, the term 'module' signifies a tangible data and information processing device that typically is limited in size and/or complexity. For example, the term 'module' can signify one or more methods or procedures that can transform data and information. The term 'module' can also signify a combination of one or more methods and procedures in a computer program. The term 'module' can also signify a small network of digital logic devices, in which interconnections of the logic devices give structure to the network. Methods and procedures comprising a module, specified in a specialized language, such as System C, can be used to generate a specification for a network of digital logic devices that process data and information with exactly the same results as are obtained from the methods and procedures.

A module can be permanently configured (e.g., hardwired to form hardware), temporarily configured (e.g., programmed with software), or a combination of the two configurations (for example, a structured ASIC). Permanently configured modules can be manufactured, for example, using Application Specific Integrated Circuits (ASICs) such as Arithmetic Logic Units (ALUs), Programmable Logic Arrays (PLAs), or Read Only Memories (ROMs), all of which are typically configured during manufacturing. Temporarily configured modules can be manufactured, for example, using Field Programmable Gate Arrays (FPGAs—for example, sold by Xilink or Intel's Altera), Random Access Memories (RAMs) or microprocessors. A module is configured to process data and information, typically using a sequence transformations (also referred to as 'operations') applied to the data and information (or in the case of ROMs and RAMS, transforming data and information by using the input information as an address for memory that stores output data and information), to perform aspects of the present innovations, embodiments and/or examples of the invention.

Modules that are temporarily configured need not be configured at any one instance in time. For example, a processor comprising one or more modules can have the modules configured at different times. The processor can comprise a set of one or more modules at one instance of time, and to comprise a different set of one or modules at a different instance of time. The decision to manufacture or implement a module in a permanently configured form, a temporarily configured form, or a combination of the two forms, may be driven by cost, time considerations, engineering constraints and/or specific design goals. The "substance" of a module's processing is independent of the form in which it is manufactured or implemented.

As used herein, the term 'algorithm' signifies a process comprising a sequence or set of operations or instructions that a module can use to transform data and information to achieve a result. A module can comprise one or more algorithms. As used herein, the term 'thread' refers to a sequence of instructions that can comprise a subset of the instructions of an entire process or algorithm. A process or algorithm can be partitioned into multiple threads that can be executed in parallel.

As used herein, the term 'computer' includes at least one information processor that, for example, can perform certain operations such as (but not limited to) the AND, OR and NOT logical operations using electronic gates that can comprise transistors, with the addition of memory (for example, memory based on flip-flops using the NOT-AND or NOT-OR operation). Such a processor is said to be Turing-complete or computationally universal. A computer, whether or not it is a digital computer, typically comprises many modules.

As used herein, the term 'software' or 'program' signifies one or more algorithms and data structures that configure a processor for use in the innovations, embodiments and examples described in this specification. Such devices configurable by software include one or more computers, for example, standalone, client or server computers, or one or more hardware modules, or systems of one or more such computers or modules. As used herein, the term "software application" signifies a set of data and instructions that configure the processor to achieve a specific result, for example, to perform word processing operations, or to encrypt a set of data.

As used herein, the term 'programming language' signifies a grammar and syntax for specifying sets of instruction and data that comprise software. Programming languages include assembler instructions, instruction-set-architecture (ISA) instructions, machine instructions, machine dependent instructions, microcode, firmware instructions, state-setting data, or either source code or object code written in any combination of one or more higher level languages, such as conventional procedural programming languages, for example, the "C" programming language or similar programming languages (such as SystemC), or object oriented programming language such as Smalltalk, C++ or the like, and any future equivalent programming languages.

Software is entered into, equivalently, read into, one or memories of the computer or computer system from a data and information storage device. The computer typically has a device for reading storage media that is used to transport the software, or has an interface device that receives the software over a network. This process is discussed in the General Computer Explanation section.

DETAILED DESCRIPTION—TECHNOLOGY SUPPORT EDA SYSTEM/WORKFLOW EXPLANATION

Figure 18:
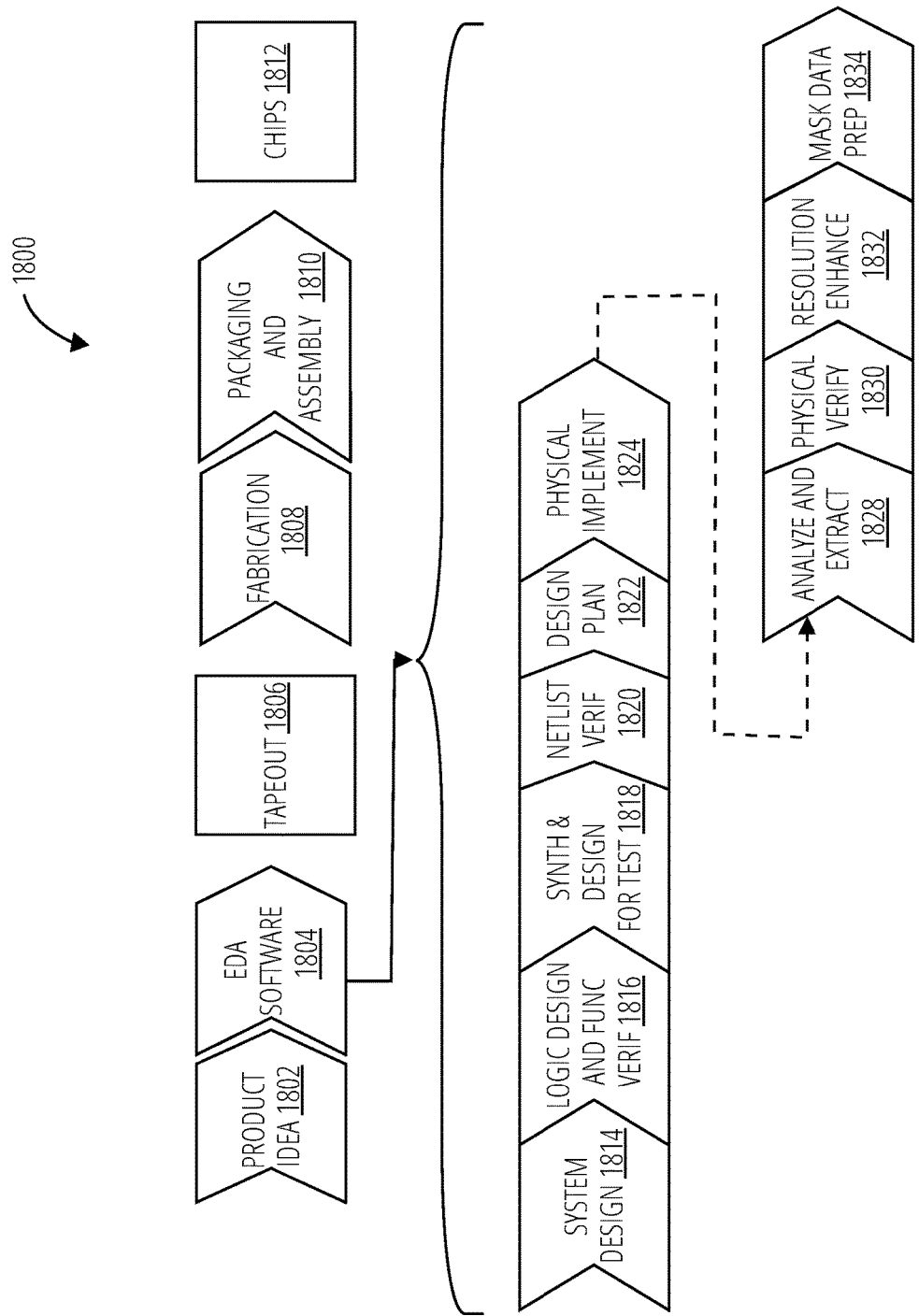
FIG. 18 illustrates processes 1800 for the design and fabrication of an integrated circuit in accordance with an embodiment of the present disclosure.

FIG. 18 illustrates various processes performed in the design, verification and fabrication of an item of manufacture such as an integrated circuit using software tools with a computer, and possibly special hardware-assisted tools, to transform and verify design data and instructions that represent the integrated circuit. These processes start with the generation of a product idea 1802 with information supplied by a designer, information which is transformed during a process to create an item of manufacture (referred to herein as a design or device) that uses an EDA software tool 1804, which may also be signified herein as EDA software, as a design tool, or a verification tool. When the design is finalized, it can be taped-out 1806, which typically is when artwork (e.g., geometric patterns) for the integrated circuit is sent to a fabrication facility to manufacture the mask set, which is then used to manufacture the integrated circuit. After tape-out, a semiconductor die is fabricated 1808 and packaging and assembly processes 1810 are performed, which result in the finished integrated circuit 1812 which may also be signified herein as a circuit, device, component, chip or SoC (System on Chip).

Items of manufacture, for example, a circuit or system are used in commerce at a variety of levels of abstraction ranging from low-level transistor layouts to high-level description languages. Most designers start at high-level of abstraction to design their circuits and systems, using a hardware description language (HDL) such as VHDL, Verilog, SystemVerilog, SystemC, MyHDL or OpenVera. The high-level HDL is easier for developers to comprehend, especially for a vast system, and may describe highly complex concepts that are difficult to grasp using a lower level of abstraction. The HDL description may be converted into other levels of abstraction as is helpful to the developers. For example, a high-level description may be converted to a logic-level register transfer level (RTL) description, a gate-level (GL) description, a layout-level description, or a mask-level description. Each lower abstraction level introduces more detail into the design description. The lower-levels of abstraction may be generated automatically by computer, derived from a design library, or created by another design automation technique. An example of a specification language at a lower level of abstraction is SPICE, much used detailed descriptions of analog-based circuits.

A design process that uses an EDA software tool 1804 includes processes 1814-1834, which are described below. This design flow description is for illustration purposes only and is not meant to limit the present disclosure. For example, an actual integrated circuit design may require a designer to perform the design operations in a different sequence than the sequence described herein.

During system design 1814, a designer describes the functionality to be manufactured. The designer can also perform what-if planning to refine the functionality and to check costs, etc. Hardware-software architecture partitioning can occur at this stage. Exemplary EDA software products from Synopsys, Inc. of Mountain View, Calif., that can be used at this stage include: Model Architect, Saber, System Studio, and Designware products.

During logic design and functional verification 1816, modules in the circuit are specified in one or more hardware description languages, or HDLs, and the design in HDL is checked for functional accuracy, that is, to match the requirements of the specification of the circuit or system being designed to ensure that the design produces the correct outputs. Exemplary HDL languages are Verilog, VHDL and SystemC. Functional verification is typically done by using software-based simulators and other tools such as testbench generators, static HDL checking tools and formal verification tools. In some situations, special hardware referred to as 'emulators' or prototyping systems' are used to speed up the functional verification. Exemplary EDA software products from Synopsys, Inc. of Mountain View, Calif. that can be used at this stage include: VCS, Vera, Designware, Magellan, Formality, ESP and Leda products. Exemplary emulator and prototyping products also available from Synopsys that can be used at this state include: Zebu® and Protolink® (RTM="Registered Trademark").

During synthesis and design for test 1818, HDL code is translated to a netlist. This netlist can be optimized for the target technology. Additionally, tests can be designed and implemented to check the finished integrated circuit. Exemplary EDA software products from Synopsys, Inc. of Mountain View, Calif. that can be used at this stage include:

Design Compiler, Physical Compiler, Test Compiler, Power Compiler, FPGA Compiler, Tetramax, and Designware products.

During netlist verification 1820, the netlist is checked for compliance with timing constraints and for correspondence with the HDL code. Exemplary EDA software products from Synopsys, Inc. of Mountain View, Calif. that can be used at this stage include: Formality, Primetime, and VCS products.

During design planning 1822, an overall floor plan for the integrated circuit is constructed and analyzed for timing and top-level routing. Exemplary EDA software products from Synopsys, Inc. of Mountain View, Calif. that can be used at this stage include: Astro and IC Compiler products.

During layout implementation 1824, the physical placement (positioning of circuit elements such as transistors or capacitors) and routing (connection of the same by a plurality of conductors) occurs, as can selection of library cells to perform specific logic functions. Exemplary EDA software products from Synopsys, Inc. of Mountain View, Calif. that can be used at this stage include: the Astro and IC Compiler products.

During analysis and extraction 1826, the circuit function is verified at the layout level, which permits refinement of the layout design. Exemplary EDA software products from Synopsys, Inc. of Mountain View, Calif. that can be used at this stage include: Astrorail, Primerail, Primetime, and Star RC/XT products.

During physical verification 1828, the layout design is checked to ensure correctness for manufacturing constraints such as DRC constraints, electrical constraints, lithographic constraints, and circuitry function matching the HDL design specification. Exemplary EDA software products from Synopsys, Inc. of Mountain View, Calif. that can be used at this stage include the Hercules product.

During resolution enhancement 1830, geometric manipulations of the layout are performed to improve manufacturability of the design. Exemplary EDA software products from Synopsys, Inc. of Mountain View, Calif. that can be used at this stage include: Proteus products.

During tape-out, data is created to be used (after lithographic enhancements are applied if appropriate) for production of lithography masks. Example EDA software products from Synopsys, Inc., that can be used during tape-out include the IC Compiler and Custom Designer families of products.

During mask-data preparation 1832, the 'tape-out' data is used to produce lithography masks that are used to produce finished integrated circuits. Exemplary EDA software products from Synopsys, Inc. of Mountain View, Calif. that can be used at this stage include the CATS family of products.

For all of the above mentioned integrated circuit design tools, similar tools from other EDA vendors, such as Cadence, Siemens, other corporate entities or various non-commercial tools from universities, or open source repositories, can be used as an alternative.

Embodiments of the present disclosure can be used during one or more of the above-described stages. Specifically, some embodiments of the present disclosure can be used in EDA software 1804.

A storage subsystem is preferably used to store the programs and data structures that provide the functionality of some or all of the EDA tools described herein, and tools applied for development of cells for the library and for physical and logical design using the library. These programs and data structures are generally executed by one or more processors in a manner known to those of ordinary skill in the art.

DETAILED DESCRIPTION—SEMANTIC SUPPORT

DETAILED DESCRIPTION—CONCLUSION

The foregoing Detailed Description signifies in isolation the individual features, structures, functions, or characteristics described herein and any combination of two or more such features, structures, functions or characteristics, to the extent that such features, structures, functions or characteristics or combinations thereof are based on the present specification as a whole in light of the knowledge of a person skilled in the art, irrespective of whether such features, structures, functions or characteristics, or combinations thereof solve any problems disclosed herein, and without limitation to the scope of the claims. When an embodiment of a claimed invention comprises a particular feature, structure, function or characteristic, it is within the knowledge of a person skilled in the art to use such feature, structure, function, or characteristic in connection with other embodiments whether or not explicitly described, for example, as a substitute for another feature, structure, function or characteristic.

In view of the foregoing Detailed Description it will be evident to a person skilled in the art that many variations may be made within the scope of innovations, embodiments and/or examples, such as function and arrangement of elements, described herein without departing from the principles described herein. One or more elements of an embodiment may be substituted for one or more elements in another embodiment, as will be apparent to those skilled in the art. The embodiments described herein signify the principles of the invention and its useful application, thereby enabling others skilled in the art to understand how various embodiments and variations are suited to the particular uses signified.

The foregoing Detailed Description of innovations, embodiments, and/or examples of the claimed inventions has been provided for the purposes of illustration and description. It is not intended to be exhaustive nor to limit the claimed inventions to the precise forms described, but is to be accorded the widest scope consistent with the principles and features disclosed herein. Obviously, many variations will be recognized by a person skilled in this art. Without limitation, any and all equivalents described, signified or incorporated by reference in this patent application are specifically incorporated by reference into the description herein of the innovations, embodiments and/or examples. In addition, any and all variations described, signified or incorporated by reference herein with respect to any one embodiment are also to be considered taught with respect to all other embodiments. Any such variations include both currently known variations as well as future variations, for example any element used herein includes a future equivalent element that provides the same function, regardless of the structure of the future equivalent.

It is intended that the scope of the claimed inventions be defined and judged by the following claims and equivalents. The following claims are hereby incorporated into the Detailed Description, with each claim standing on its own as a separate embodiment. Disclosed embodiments can be described with more features than are expressly recited in the claims.

What is claimed is:

1. A method comprising:
   receiving a post-layout circuit netlist comprising a rail block, power nets that do not belong to the rail block, and signal nets; wherein the rail block includes a voltage source, and the power nets drive the signal nets from the rail block;

combining, by a processor, the rail block and the power nets to generate an updated rail block;

partitioning the post-layout circuit netlist including the signal nets and excluding the updated rail block, into signal blocks supplied by the updated rail block; and applying a circuit simulation to the partitioned signal blocks.

2. The method of claim 1, wherein partitioning the post-layout circuit netlist into signal blocks comprises:
grouping connected resistors in the signal nets to create a super-network;
analyzing the resistor distribution of the super-network for cut locations;
cutting the super-resistor network at the cut locations to generate sub-nets; and
recording a cut conductance/capacitance maximum value of each of the sub-nets to measure a level of cross-talk.

3. The method of claim 1, wherein the post-layout circuit netlist results from RC extraction applied to a pre-layout circuit netlist, and partitioning the post-layout circuit netlist into signal blocks comprises:
shorting all resistors in the pre-layout circuit netlist and the post-layout circuit netlist;
recording all instances and their connectivity in the pre-layout circuit netlist;
checking each instance connectivity path of the post-layout circuit netlist against the connectivity in the pre-layout circuit netlist; and
cutting all paths in the post-layout circuit netlist which do not exist in the pre-layout circuit netlist.

4. The method of claim 1, wherein applying the circuit simulation comprises:
scheduling the signal blocks for simulation in a simulation order that is based on their driver-load relationship or parent-child relationship;
solving the KCL and KVL equations in each of the signal blocks to generate simulation results; and
outputting the simulation results as waveforms.

5. The method of claim 4, further comprising:
performing array optimization in the signal blocks that are memory circuits.

6. The method of claim 1 further comprising:
after partitioning the post-layout circuit netlist into signal blocks, splitting the updated rail block into the rail block and power nets;
partitioning the power nets into power net blocks which drive different corresponding sub-circuits during the circuit simulation, the sub-circuits comprising the signal blocks.

7. The method of claim 6, further comprising:
selecting a pair of nodes between two power net blocks, wherein the pair of nodes includes one node from one power net block, and a second node from another power net block along the border of the super-network; and
selecting a pair of nodes between two sub-circuit designs, wherein the pair of nodes includes one node from one sub-circuit, and a second node from another sub-circuit.

8. The method of claim 1 wherein the post-layout circuit netlist results from RC extraction applied to a pre-layout circuit netlist, and partitioning the post-layout circuit netlist into signal blocks results in a same number of signal blocks as a partitioning of the pre-layout circuit netlist.

9. The method of claim 1 wherein the post-layout circuit netlist results from RC extraction applied to a pre-layout circuit netlist, and partitioning the post-layout circuit netlist into signal blocks comprises cutting the post-layout circuit netlist at same locations as a partitioning of the pre-layout circuit netlist.

10. A system comprising:
a memory storing instructions; and
a processor, coupled with the memory and to execute the instructions, the instructions when executed cause the processor to:
access a shared database storing a pre-layout circuit netlist of an integrated circuit design and a post-layout circuit netlist of the integrated circuit design; the post-layout circuit netlist comprising one or more rail blocks, one or more power nets that do not belong to the rail blocks, and one or more signal nets; wherein the rail blocks includes a voltage source, the power nets drive the signal nets from the rail blocks, and the post-layout circuit netlist comprises parasitic RC circuit elements produced by RC extraction applied to the integrated circuit design;
partition the signal nets into signal blocks supplied by the rail blocks and/or power nets, wherein partitioning into the signal blocks is based on the parasitic RC circuit elements produced by the RC extraction and on a partitioning of the pre-layout circuit netlist; and
apply a circuit simulation to sub-circuits defined by the partitioned signal blocks of the post-layout circuit netlist.

11. The system of claim 10 wherein the instructions when executed further cause the processor to:
compare the pre-layout circuit netlist and the post-layout circuit netlist; and
apply a circuit simulation to the pre-layout circuit netlist in parallel with applying the circuit simulation to sub-circuits defined by the partitioned signal blocks of the post-layout circuit netlist, wherein the parallel circuit simulations share data.

12. The system of claim 10 wherein applying the circuit simulations in parallel further comprise performing a dynamic trace between the simulation results of the parallel circuit simulations.

13. The system of claim 10 wherein the shared database comprises a combination of the pre-layout circuit netlist and the post-layout circuit netlist.

14. The system of claim 10 wherein the instructions when executed further cause the processor to:
partition the power nets into power net blocks which drive different corresponding sub-circuits during the circuit simulation.

15. The system of claim 10 wherein partitioning the signal nets into signal blocks results in a same number of signal blocks as the partitioning of the pre-layout circuit netlist.

16. A non-transitory computer readable medium comprising stored instructions, which when executed by a processor, cause the processor to:
receive a post-layout circuit netlist of an integrated circuit design; the post-layout circuit netlist comprising one or more rail blocks, one or more power nets that do not belong to the rail blocks, and one or more signal nets; wherein the rail blocks includes a voltage source, the power nets drive the signal nets from the rail blocks, and the post-layout circuit netlist comprises parasitic RC circuit elements produced by RC extraction applied to the integrated circuit design;

partition, by a processor, the signal nets into signal blocks supplied by the rail blocks and/or power nets, wherein partitioning the signal blocks is based on a partitioning of a pre-layout circuit netlist of the integrated circuit design; and apply a circuit simulation to sub-circuits defined by the partitioned signal blocks.

17. The non-transitory computer readable medium of claim 16 wherein partitioning the signal nets into signal blocks results in a same number of signal blocks as the partitioning of the pre-layout circuit netlist.

18. The non-transitory computer readable medium of claim 16 wherein the instructions when executed further cause the processor to:

partition the power nets into power net blocks which drive different corresponding sub-circuits during the circuit simulation.

19. The non-transitory computer readable medium of claim 16 wherein the pre-layout circuit netlist and the post-layout circuit netlist are stored in a shared database.

20. The non-transitory computer readable medium of claim 19 wherein partitioning of the pre-layout circuit netlist and partitioning of the post-layout circuit netlist are also stored in the shared database.

\* \* \* \* \*